United States Patent
Barmichev et al.

(10) Patent No.: US 11,332,232 B2
(45) Date of Patent: May 17, 2022

(54) VERTICAL TAIL STRUCTURE HAVING SYMMETRY ACTION SLATS

(71) Applicant: The Boeing Company, Chicago, IL (US)

(72) Inventors: Sergey D. Barmichev, Kirkland, WA (US); Mithra M. K. V. Sankrithi, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 265 days.

(21) Appl. No.: 16/555,867

(22) Filed: Aug. 29, 2019

(65) Prior Publication Data

US 2021/0061438 A1 Mar. 4, 2021

(51) Int. Cl.
*B64C 5/10* (2006.01)
*B64C 9/00* (2006.01)
*B64C 5/02* (2006.01)

(52) U.S. Cl.
CPC .................. *B64C 5/10* (2013.01); *B64C 5/02* (2013.01); *B64C 9/00* (2013.01)

(58) Field of Classification Search
CPC .... B64C 9/16; B64C 9/18; B64C 9/20; B64C 5/02; B64C 5/00; B64C 9/00
See application file for complete search history.

(56) References Cited

U.S. PATENT DOCUMENTS

| | | |
|---|---|---|
| 1,574,567 A | 2/1926 | Flettner |
| 1,766,025 A | 6/1930 | Junkers |
| 2,387,526 A * | 10/1945 | Nagamatsu ............. B64C 21/02 244/198 |
| 7,913,949 B2 | 3/2011 | Hoffenberg |
| 8,282,038 B2 | 10/2012 | MacGregor et al. |
| 8,622,350 B1 | 1/2014 | Hoffenberg |
| 8,733,696 B2 | 5/2014 | Tanguy |
| 9,090,326 B2 | 7/2015 | Whalen et al. |
| 9,592,167 B2 | 3/2017 | Bogaerts et al. |
| 2008/0302919 A1* | 12/2008 | Hoffenberg ............... B64C 9/12 244/214 |
| 2012/0048995 A1 | 3/2012 | Tanguy |
| 2012/0091266 A1 | 4/2012 | Whalen et al. |

FOREIGN PATENT DOCUMENTS

| | | | |
|---|---|---|---|
| EP | 0256374 A1 | 2/1988 | |
| EP | 0996568 A1 | 5/2000 | |
| EP | 2441669 A2 | 4/2012 | |
| GB | 448703 A * | 6/1936 | ............. B64C 27/82 |

* cited by examiner

*Primary Examiner* — Philip J Bonzell
(74) *Attorney, Agent, or Firm* — Kwan & Olynick LLP

(57) ABSTRACT

Provided are vertical tail structures with symmetry action slat systems. Specifically, a vertical tail structure comprises a main element and a leading edge element. The leading edge element comprises a first slat body and a second slat body that are symmetrically positioned on either side of a longitudinal centerline of the vertical tail structure. Each slat body is configured to move between a retracted position and an extended position to increase a camber sag of an airfoil of the vertical tail structure and thereby increase a maximum aerodynamic yawing moment provided by the vertical tail structure. In a first operable mode, each of the slat bodes are in the respective retracted position. In a second operable mode, one of the slat bodies is in the respective extended position. The extended position of each of the slat bodies includes a pitch angle and an extension distance from the main element.

20 Claims, 22 Drawing Sheets

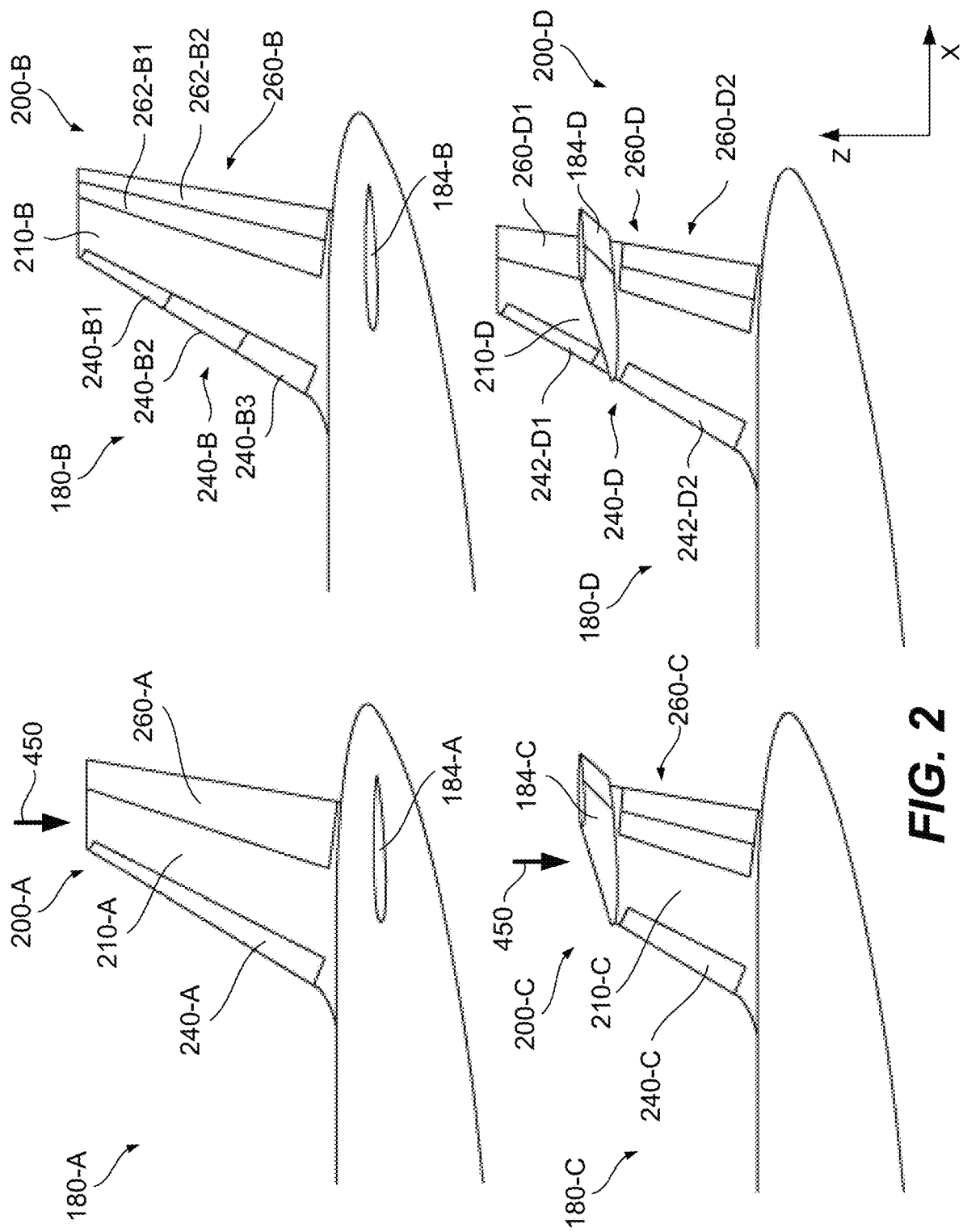

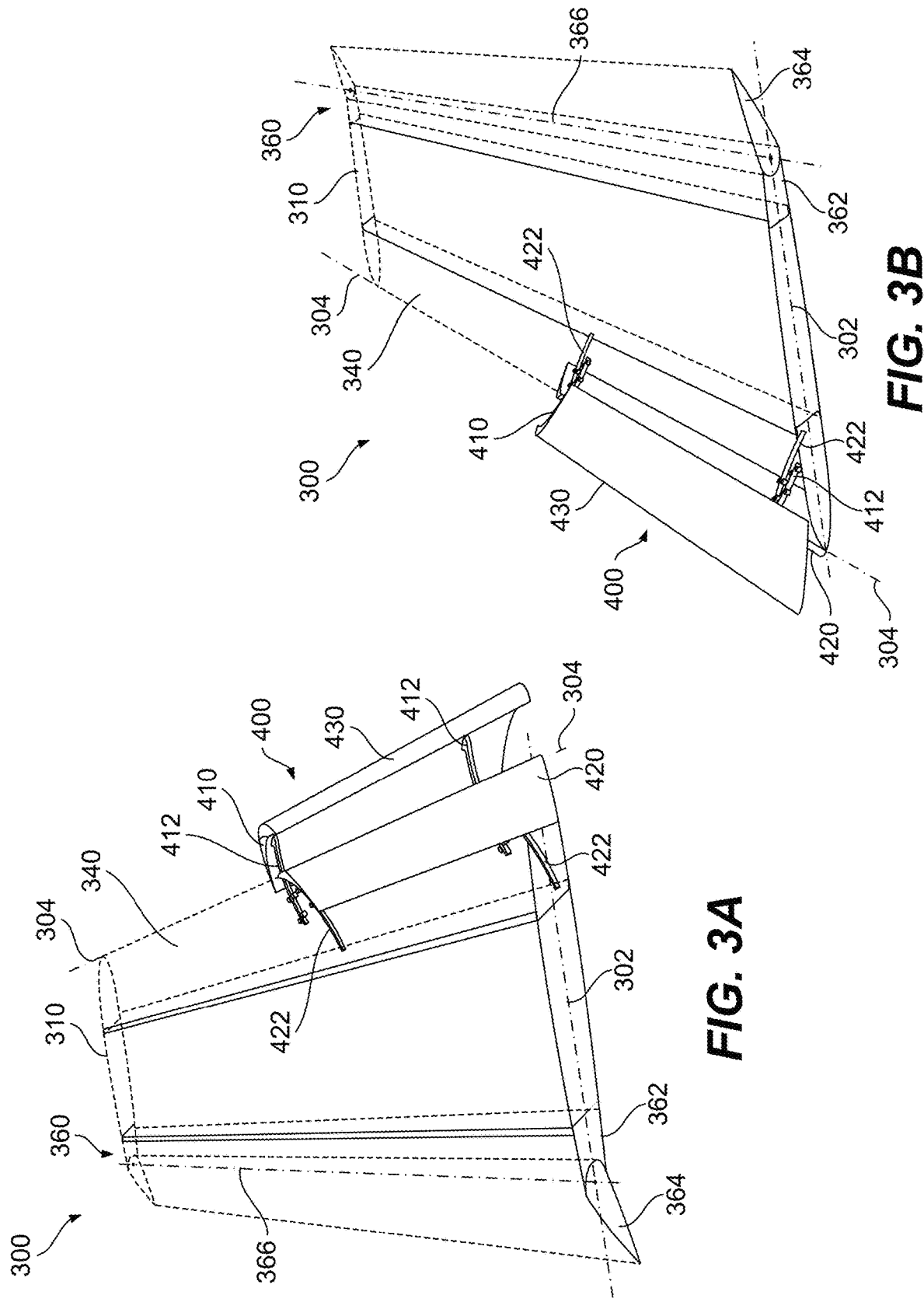

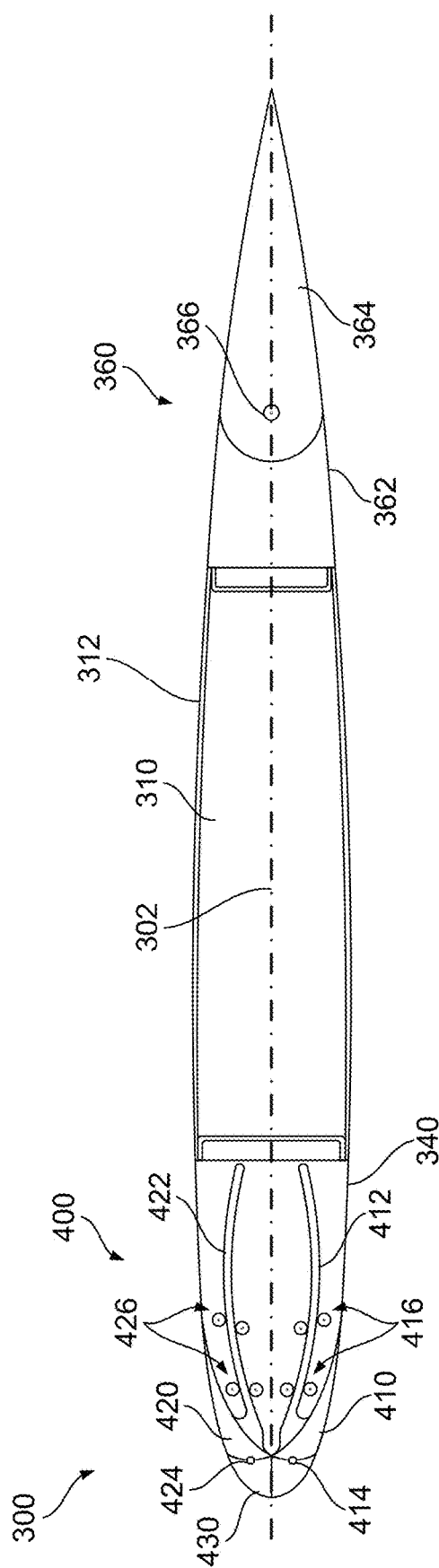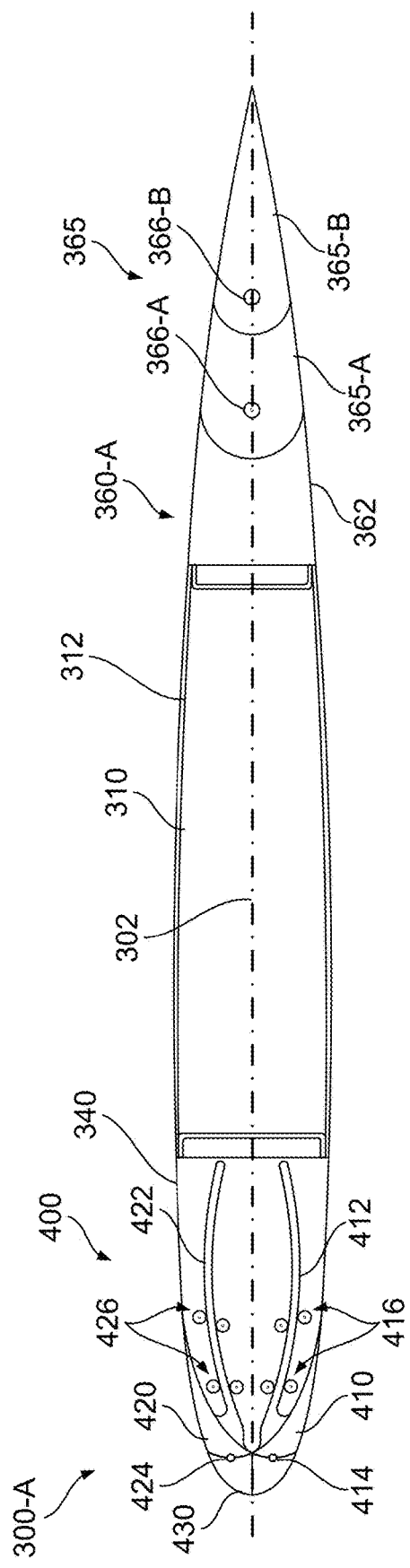

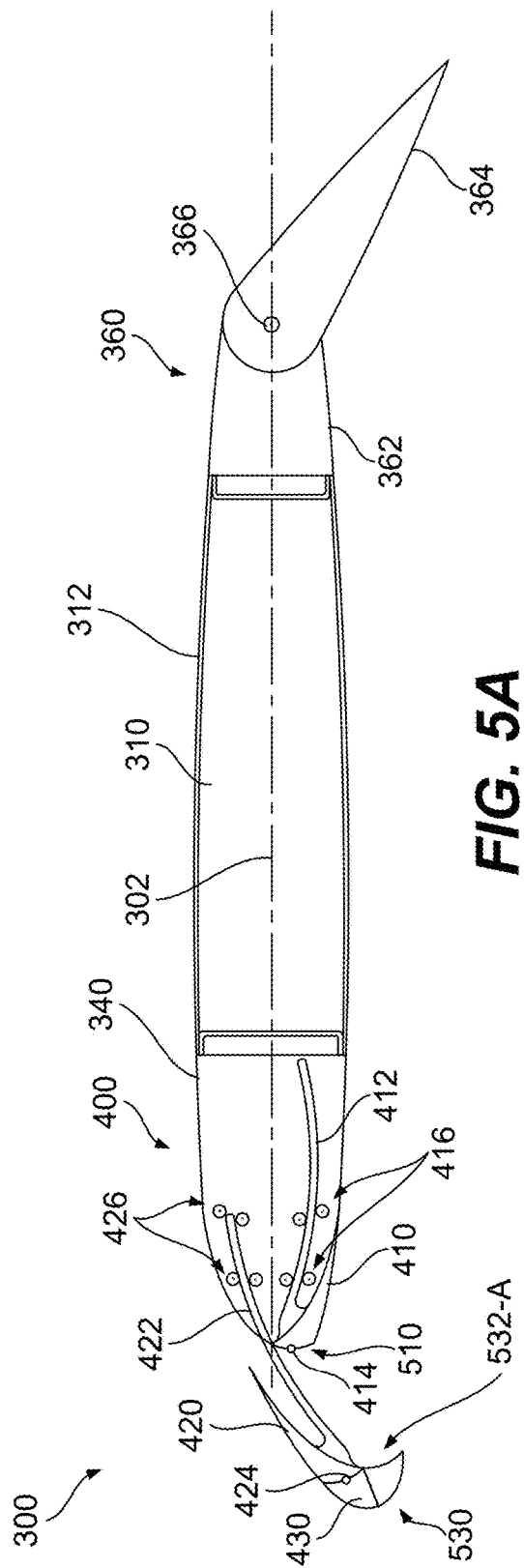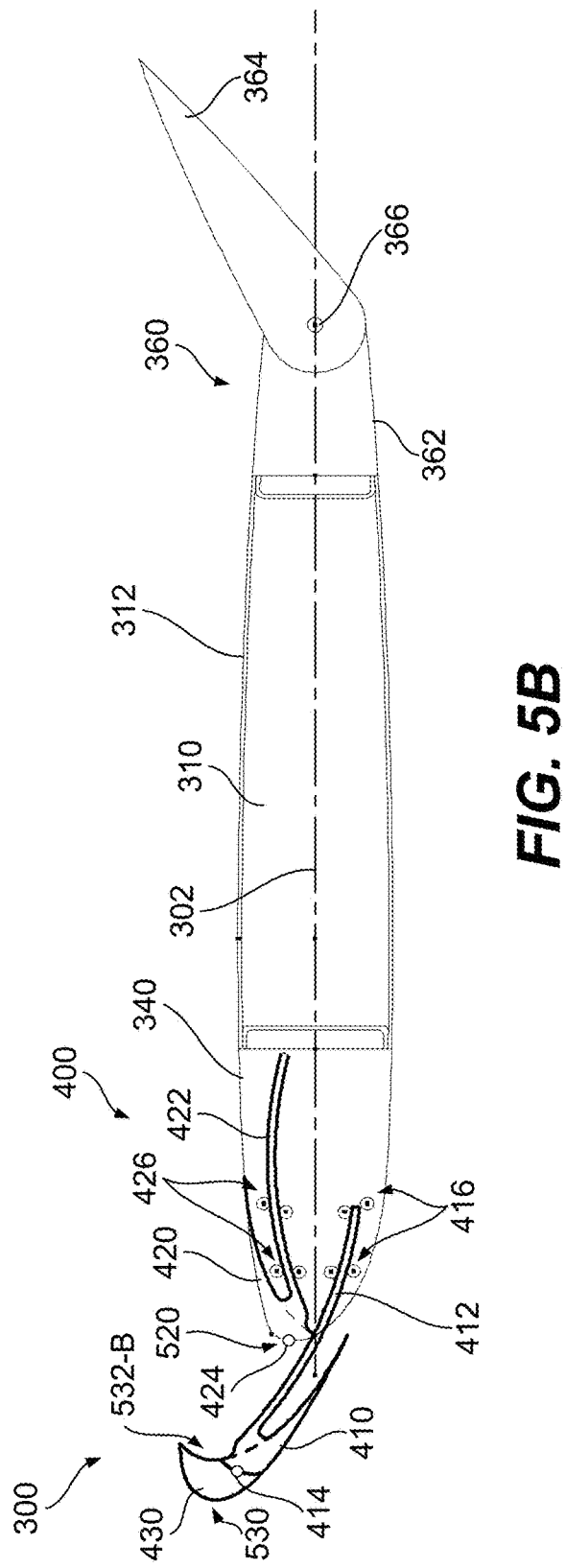

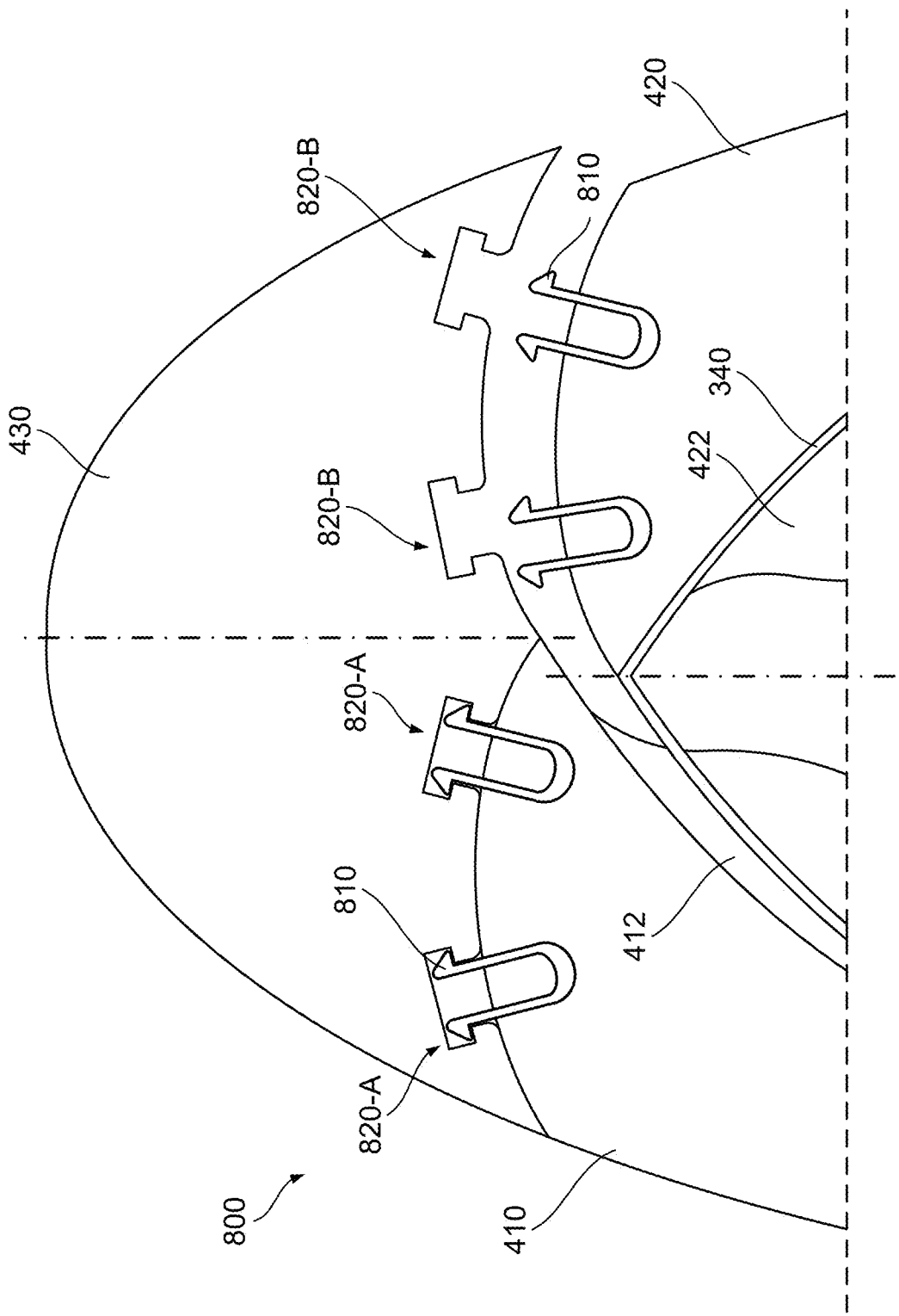

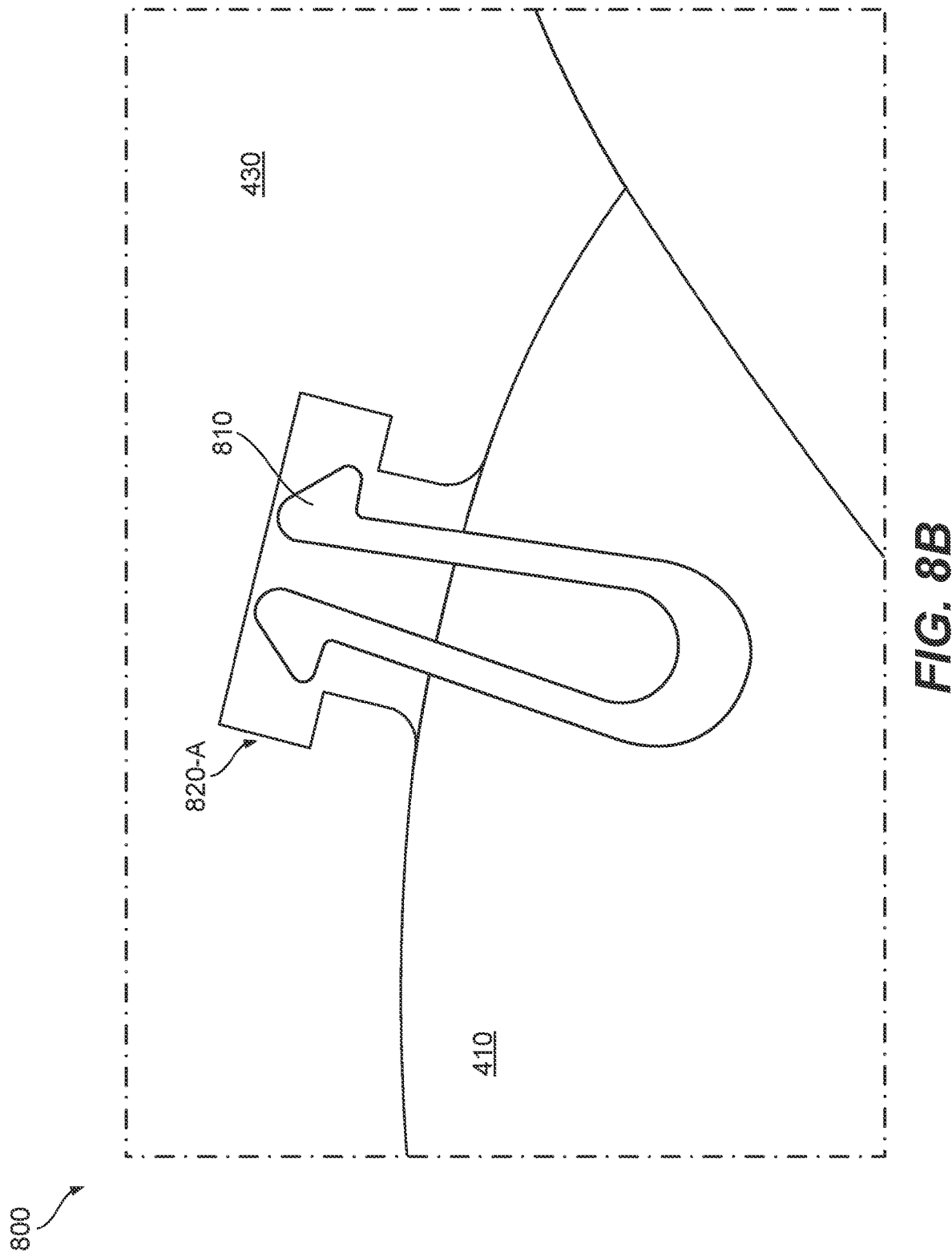

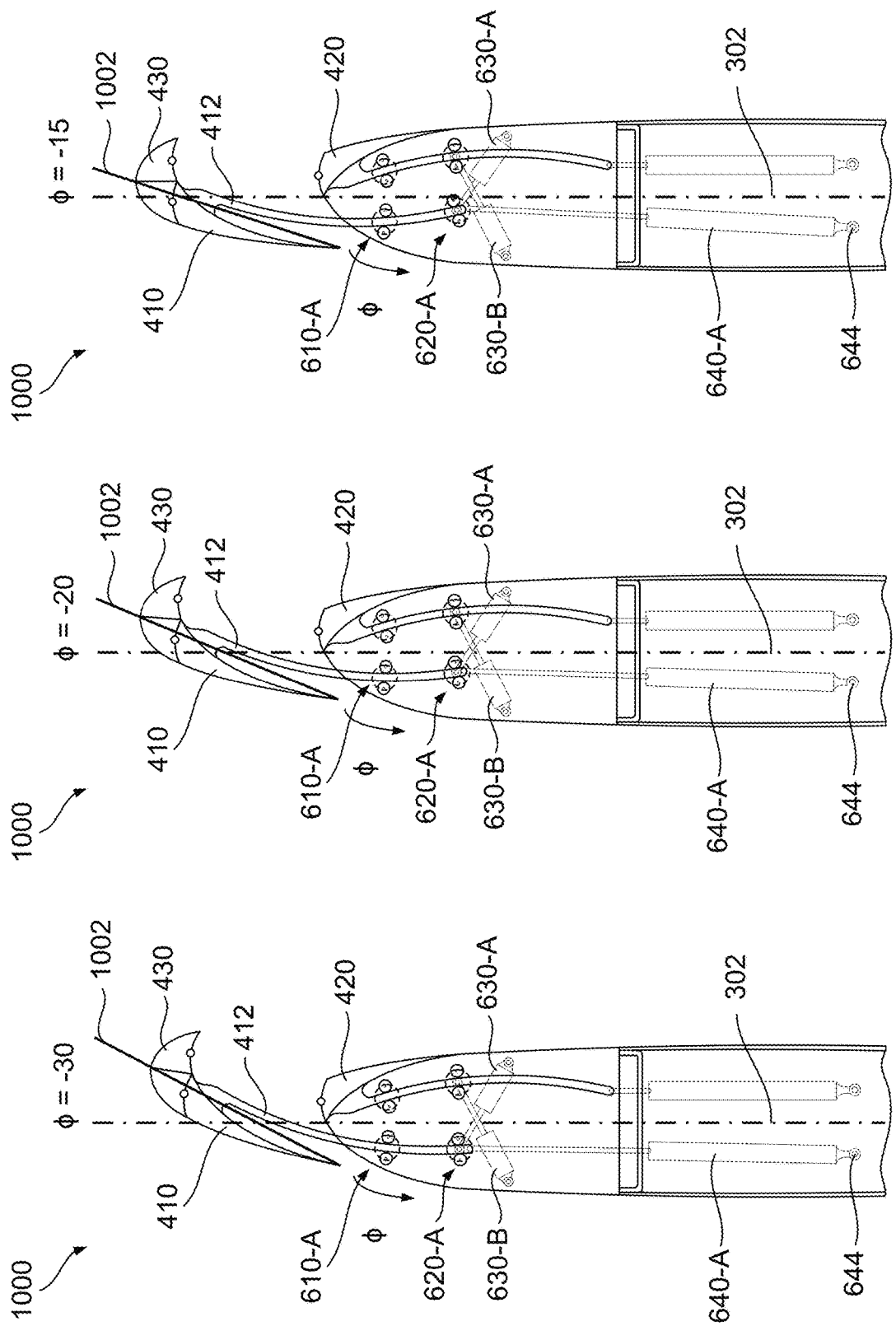

VERTICAL TAIL STRUCTURE HAVING SYMMETRY ACTION SLATS

TECHNICAL FIELD

The present disclosure relates generally to airfoil structures, and in particular, to a movable leading edge component of a vertical tail structure.

BACKGROUND

With airborne mobile platforms such as commercial and military aircraft, tail surfaces are sized to maintain control of the aircraft throughout the flight envelope. Presently, there is an interest in reducing the "loss of control" speed of an aircraft that is caused by separation of flow from the vertical tail. Present day solutions involve simply constructing a larger vertical tail or increasing the size of a rudder used with the tail. Simply increasing the overall size of the vertical tail adds weight and drag. Increasing the size of the rudder also adds weight and drag, and can necessitate the use of larger and heavier control actuators.

On aircraft wings and other airfoil structures, moveable leading edge devices are sometimes used to delay flow separation. Conventional leading edge devices, designed to operate on wings, are intended to delay flow separation only at positive angles of attack. Because a tail must operate at both positive and negative sideslip angles (aircraft nose left or right), such (asymmetric) leading edge devices would not be suitable for use on a vertical tail.

SUMMARY

The following presents a simplified summary of the disclosure in order to provide a basic understanding of certain s elements of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are various vertical tail structures for stabilization of various mobile platforms, and associated methods of operation. Specifically, a vertical tail structure (300) comprises: a main element (310), and a leading edge element (340) comprising a first slat body (420) and a second slat body (410), wherein the slat bodies are symmetrically positioned on either side of a longitudinal centerline (302) of the vertical tail structure. Each slat body is configured to move between a retracted position and an extended position to increase a camber sag (C-1, C-2, C-3) of an airfoil of the vertical tail structure and thereby increase a maximum aerodynamic yawing moment provided by the vertical tail structure.

The vertical tail structure may be configured to operate in a first mode and a second mode. In the first mode, each of the slat bodies are in the respective retracted position. In the second mode, either the first slat body or the second slat body is in the respective extended position.

The extended position of each of the slat bodies may include a pitch angle ($\phi$) of the respective slat body and an extension distance ($\gamma$) of the slat body from the main element.

The leading edge element may further comprise a bullnose (430) that is reversibly coupled to each of the slat bodies when the vertical tail structure is in the first mode.

The bullnose may be decoupled from the second slat body when the first slat body is in the respective extended position in the second mode. The bullnose may define a leading edge of the vertical tail structure and is symmetrically positioned with respect to the longitudinal centerline of the vertical tail structure. In the first mode, the bullnose may be reversibly coupled to each of the slat bodies via a locking mechanism (700, 800).

The vertical tail structure may further comprise a trailing edge element (360) comprising a rudder (364, 365). The vertical tail structure may further comprise a set of slat rails (412, 422) coupled to each slat body. Each slat rail may be configured to travel between rollers (602) on a rotating platform (610-A, 610-B, 620-A, 620-B). The vertical tail structure may further comprise an actuator (640-A, 640-B, 650-A, 650-B) for moving each slat body between the respective retracted position and respective extended position.

Other implementations of this disclosure include corresponding devices, systems, and methods. These other implementations may each optionally include one or more of the following features. For instance, provided is an aircraft (100) comprising a vertical tail structure (300) as described.

Also provided is a method (1300) for increasing a maximum aerodynamic yawing moment provided by a vertical tail structure (300). The vertical tail structure comprises a main element (310), and a leading edge element (340) comprising a first slat body (420) and a second slat body (410). The slat bodies are symmetrically positioned on either side of a longitudinal centerline (302) of the vertical tail structure. The vertical tail structure further comprises and a bullnose (430) reversibly coupled to each of the slat bodies. The method comprises releasing (1302) a locking mechanism (700, 800) to uncouple the first slat body from the bullnose, and moving (1304) the second slat body from a retracted position to an extended position to increase a camber sag (C-1, C-2, C-3) of an airfoil of the vertical tail structure.

The extended position may include a pitch angle ($\phi$) of the second slat body and an extension distance ($\gamma$) of the second slat body from the main element. The second slat body may be extended by an actuator (640-A, 640-B, 650-A, 650-B) configured to move a slat rail (412, 422) through rollers (602) on a rotating platform (610-A, 610-B, 620-A, 620-B), wherein the slat rail is coupled to the second slat body.

The method may further comprise deflecting (1308) a rudder (364, 365) of a trailing edge element (360) of the vertical tail structure to further increase the camber sag of the airfoil.

Clause 2: The vertical tail structure of Clause 1 wherein the vertical tail structure is configured to operate in a first mode and a second mode; wherein in the first mode, each of the slat bodies are in the respective retracted position; wherein in the second mode, either the first slat body or the second slat body is in the respective extended position.

Clause 3: The vertical tail structure of Clause 2, wherein the extended position of each of the slat bodies includes a pitch angle ($\phi$) of the respective slat body and an extension distance ($\gamma$) of the slat body from the main element.

Clause 4: The vertical tail structure of Clause 2 or 3, wherein the leading edge element further comprises a bullnose that is reversibly coupled to each of the slat bodies when the vertical tail structure is in the first mode, wherein the bullnose is decoupled from the second slat body when the first slat body is in the respective extended position in the second mode.

Clause 5: The vertical tail structure of Clause 4, wherein the bullnose defines a leading edge of the vertical tail structure and is symmetrically positioned with respect to the longitudinal centerline of the vertical tail structure.

Clause 6: The vertical tail structure of Clause 4 or 5, wherein in the first mode, the bullnose is reversibly coupled to each of the slat bodies via a locking mechanism.

Clause 7: The vertical tail structure of any of Clauses 2-6 further comprising a trailing edge element comprising a rudder.

Clause 8: The vertical tail structure of any of Clauses 2-7, further comprising a set of slat rails coupled to each slat body, wherein each slat rail is configured to travel between rollers on a rotating platform; and an actuator for moving each slat body between the respective retracted position and respective extended position.

Clause 9: An aircraft comprising a vertical tail structure, wherein the vertical tail structure comprises a main element; and a leading edge element comprising a first slat body and a second slat body, wherein the slat bodies are symmetrically positioned on either side of a longitudinal centerline of the vertical tail structure; wherein each slat body is configured to move between a retracted position and an extended position to increase a camber sag of an airfoil of the vertical tail structure and thereby increase a maximum aerodynamic yawing moment provided by the vertical tail structure.

Clause 10: The aircraft of Clause 9, wherein the vertical tail structure is configured to operate in a first mode and a second mode; wherein in the first mode, each of the slat bodies are in the respective retracted position; wherein in the second mode, either the first slat body or the second slat body is in the respective extended position.

Clause 11: The aircraft of Clause 10, wherein the extended position of each of the slat bodies includes a pitch angle ($\phi$) of the respective slat body and an extension distance ($\gamma$) of the slat body from the main element.

Clause 12: The aircraft of Clause 10 or 11, wherein the leading edge element further comprises a bullnose that is reversibly coupled to each of the slat bodies when the vertical tail structure is in the first mode, wherein the bullnose is decoupled from the second slat body when the first slat body is in the respective extended position in the second mode.

Clause 13: The aircraft of Clause 12, wherein the bullnose defines a leading edge of the vertical tail structure and is symmetrically positioned with respect to the longitudinal centerline of the vertical tail structure.

Clause 14: The aircraft of Clause 12 or 13, wherein in the first mode, the bullnose is reversibly coupled to each of the slat bodies via a locking mechanism.

Clause 15: The aircraft of any of Clauses 10-14, further comprising a trailing edge element comprising a rudder.

Clause 16: The aircraft of any of Clauses 10-15, further comprising a set of slat rails coupled to each slat body, wherein each slat rail is configured to travel between rollers on a rotating platform; and an actuator for moving each slat body between the respective retracted position and respective extended position.

Clause 17: A method for increasing a maximum aerodynamic yawing moment provided by a vertical tail structure, wherein the vertical tail structure comprises a main element, a leading edge element comprising a first slat body and a second slat body, wherein the slat bodies are symmetrically positioned on either side of a longitudinal centerline of the vertical tail structure, and a bullnose reversibly coupled to each of the slat bodies; wherein the method comprises releasing a locking mechanism to uncouple the first slat body from the bullnose, and moving the second slat body from a retracted position to an extended position to increase a camber sag of an airfoil of the vertical tail structure.

Clause 18: The method of Clause 17, wherein the extended position includes a pitch angle ($\phi$) of the second slat body and an extension distance ($\gamma$) of the second slat body from the main element.

Clause 19: The method of Clause 17 or 18, wherein the second slat body is extended by an actuator configured to move a slat rail through rollers on a rotating platform, wherein the slat rail is coupled to the second slat body.

Clause 20: The method of any of Clauses 17-19, further comprising deflecting a rudder of a trailing edge element of the vertical tail structure to further increase the camber sag of the airfoil.

These and other examples are described further below with reference to the figures.

BRIEF DESCRIPTION OF THE DRAWINGS

The disclosure may best be understood by reference to the following description taken in conjunction with the accompanying drawings, which illustrate particular examples of the present disclosure.

FIG. 2 illustrates various empennage assemblies with tail structures that may incorporate symmetry action slats, in accordance with one or more examples;

FIGS. 3A and 3B illustrate perspective views of a vertical tail structure with symmetry action slats, in accordance with one or more examples;

FIGS. 4A and 4B illustrate top-down cross-sectional views of vertical tail structures with symmetry action slats, in accordance with one or more examples;

FIGS. 5A and 5B illustrate a top-down cross-sectional view of a vertical tail structure with a slat in an extended position, in accordance with an illustrative example;

FIGS. 8A and 8B illustrate another locking mechanism between the slats and a bullnose of a symmetry action slat system, in accordance with one or more examples;

FIGS. 10A, 10B, and 10C illustrate changes in pitch of a slat on a vertical tail structure, in accordance with an illustrative example;

DETAILED DESCRIPTION

Figure 1:
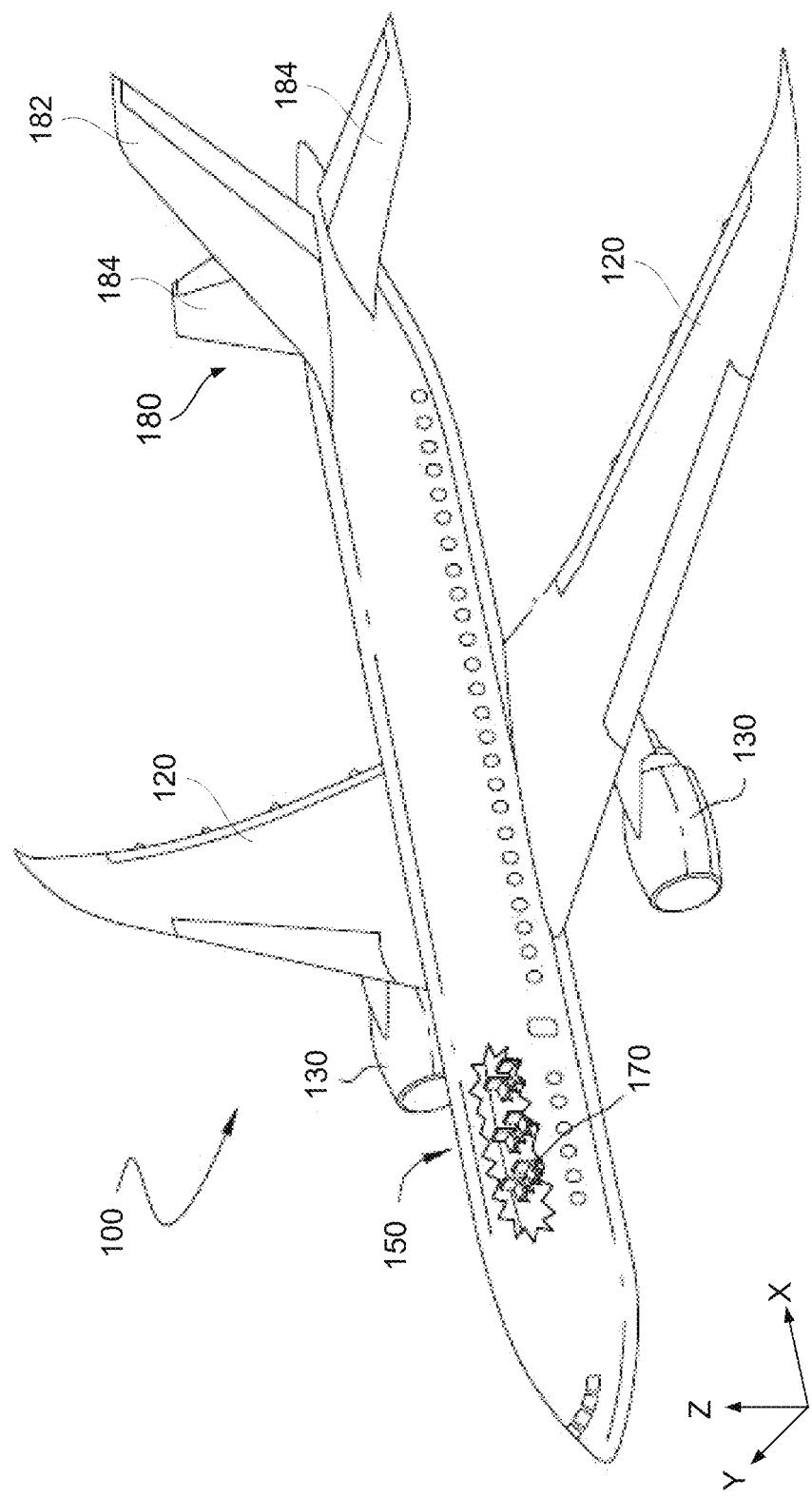
FIG. 1 is a schematic illustration of an aircraft that may include a vertical tail structure with symmetry action slats as described herein, in accordance with one or more examples.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as vertical tail structures. However, it should be noted that the techniques and mechanisms of the present disclosure may apply to various other structures with leading edge elements of various other vehicles or building structures, such as marine vehicles or land vehicles. In the following description, numerous specific details are set forth in order to provide a thorough understanding of the present disclosure. Particular example examples of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some examples include multiple iterations of a technique or multiple instantiations of a mechanism unless noted otherwise.

Overview

The present disclosure describes novel vertical tail structures and other stabilization airfoil structure which include a symmetry action slat system. Such structures may be utilized on airborne mobile platforms such as aircraft to provide yaw stability and yaw control moment to maintain control of the aircraft during operation. The use of the slat system may provide additional control power in critical conditions including a one-engine-out condition for twin engine planes or during high angle of attack rudder stalls.

The symmetry action slat system may be configured on a leading edge element of the vertical tail structure. The system may comprise two slats (a left slat and a right slat) symmetrically positioned on either side of a centerline running down the center length of the vertical tail structure. Each slat may be slidably coupled to the leading edge element via one or more slat rails that are positioned along rotatable platforms which guide the movement and positioning of the slats.

The slat system may operate in a first mode with both slats in a retracted position. In the first mode, yaw stabilization may be performed by using a hinged rudder or trimmer. In conditions that warrant additional stability control, the slat system may operate in a second mode in which one of the slats is moved to an extended position to increase the camber of the airfoil of the vertical tail structure. The extended slat may also create suction airflow to keep the airflow attached to the vertical tail structure at high angles of attack. The hinged rudder or trimmer may also be activated during the second mode.

One or more of the slat rails for each slat may be coupled to a longitudinal actuator which moves the respective slat between the retracted position and the extended position. Additional lateral actuators may be configured to move the rotatable platforms toward or away from the centerline in order to adjust the pitch angle of the slat in the extended position.

Each slat may be coupled to a forward bullnose structure which defines the leading edge of the vertical tail structure. The bullnose may be coupled to each slat by a locking mechanism. When a first slat is to be extended, the second slat may be decoupled from the bullnose by releasing the locking mechanism such that bullnose remains attached to the first slat and may travel with the first slat into the extended position.

Extension of a slat may increase the camber of the airfoil, as well as create a gap for suction air flow, allowing the vertical tail structure to operate at a higher angle of attack or side slip angle, and produce a higher lift coefficient (Cl). As such, the symmetry action slat system may increase the lift coefficient of the vertical tail structure across the spectrum of operational angles of attack and dramatically delay stall conditions.

Description of Examples

To better understand various aspects of vertical tail structures, a brief description of an aircraft and aircraft wing is now presented. FIG. 1 is a schematic illustration of aircraft 100, in accordance with some examples. As depicted in FIG. 1, aircraft 100 is defined by a longitudinal axis (X-axis), a lateral axis (Y-axis), and a vertical axis (Z-axis). In various examples, aircraft 100 comprises fuselage 150 with interior 170. Aircraft 100 includes wings 120 coupled to fuselage 150. Aircraft 100 also includes engines 130 mounted on wings 120 of fuselage 150.

The rear of fuselage 150 may comprise empennage 180 comprising various tail structures, including vertical stabilizer 182 and horizontal stabilizers 184. The term empennage may be referred to herein as a tail or tail assembly. Aircraft 100 shown in FIG. 1 is one example of a vehicle in which symmetry action slats may be implemented, such as on vertical tail structure 182, in accordance with an illustrative example. The described structures may also be implemented for various other portions of aircraft 100, such as on wings 120 or horizontal stabilizers 184.

FIG. 2 illustrates various empennage assemblies with tail structures that may incorporate symmetry action slats, in accordance with one or more examples. FIG. 2 depicts empennage 180-A, 180-B, 180-C, and 180-D. According to one or more examples, empennage 180-A comprises vertical tail structure 200-A including main element 202-A, leading edge (LE) element 240-A, trailing edge (TE) element 260-A, and horizontal stabilizer 184-A. Vertical tail structure 200-A may be a conventional tail, and LE element 240-A may comprise a single segment symmetry action slat extending approximately the height of tail structure 200-A. TE element 260-A may be configured as a single hinge rudder.

According to one or more examples, empennage 180-B comprises vertical tail structure 200-B including main element 210-B, LE element 240-B, TE element 260-B, and horizontal stabilizer 184-B. Vertical tail structure 180-B is also configured as a conventional tail. However, LE element 240-B may comprise a multi-segment symmetry action slat with multiple slat segments 240-B1, 240-B2, and 240-B3. As depicted LE element 240-B includes 3 segments extending along the height of tail structure 200-B. Furthermore, TE element 260-B may be configured as a dual hinge rudder with first structure 262-B1 and second structure 262-B2. In some examples, second structure 262-B2 is a servo-tab or anti-balance tab.

The described LE element systems may be implemented with other types of vertical tail structures, including T-tails, Y-tails, and cruciform tails. According to one or more examples, empennage 180-C comprises a vertical Y-tail or T-tail structure 200-C with horizontal stabilizers 284-C extending from the top edge of main element 210-C. Tail structure 200-C may further comprise single segment LE element 240-C and TE element 260-C configured as a dual hinge rudder.

According to one or more examples, empennage 180-D comprises a cruciform tail structure 200-D with horizontal stabilizers 184-D extending from each side of the middle portion of main element 210-D. In various examples, horizontal stabilizers 284-D may be configured in a Y configuration or a T configuration. The horizontal stabilizers 284-D may divide an upper portion and a lower portion of vertical tail structure 200-D. The upper portion of LE element 240-D may include a single segment symmetry action slat 242-D1, and the lower portion of LE element 240-D may include a single symmetry action slat 242-D2. Similarly, TE element 260-D may comprise rudder 260-D1 positioned at the upper portion, and a dual hinge rudder 260-D2 at the lower portion.

FIG. 2 illustrates just several examples of vertical tail structures that may implement the described systems and methods. It should be recognized that vertical tail structures described herein may include any combination of tail structures, LE elements, rudders, and horizontal stabilizers.

Symmetry Action Slat Components

With reference to FIGS. 3A and 3B, shown are perspective views of a vertical tail structure 300 with symmetry action slats, in accordance with one or more examples. Vertical tail structure 300 may be a vertical stabilizer. Vertical tail structure 300 will be described with reference to a particular configuration as shown. However, it should be recognized that the described concepts, structures, and processes may be applied to various configurations of airfoil structures and other configurations of vertical tail structures, including those described with reference to FIG. 2. In some examples, vertical tail structure 300 comprises main element 310, LE element 340, and TE element 360. Centerline 302 runs along the length of vertical tail structure 300 and intersects pivot axis 366. A vertical axis 304 runs down the front of LE element 340 and intersects centerline 302 between slats 410 and 420.

TE element 360 may include rudder 364 which defines the trailing edge of the airfoil of the vertical tail structure. Rudder 364 may pivot about pivot axis 366. In some examples, rudder 364 is a single hinge rudder. However, in some examples, vertical tail structure 300 may be configured with a dual or multi-hinged rudder on TE element 360. Various other rudder mechanisms may be implemented with the TE element, such as flexible panel structures. Various other trailing edge structures may be implemented with the TE element, including trim tabs, servo tabs, anti-servo tabs, and flaps.

In some examples, LE element 340 comprises symmetrical action slat system 400, or symmetry action slat system 400. In various examples, slat system 400 comprises a first slat body and a second slat body. The first slat body may be left slat 410 coupled the LE element via left slat rails 412, and the second slat body may be right slat 420 coupled to the LE element via right slat rails 422. As used herein each of slats 410 and 420 may be referred to as a "slat" or "slat body." Slat system 400 may further comprise bullnose 430, which is positioned in front of each slat, and which defines the leading edge of the airfoil of the vertical tail structure. Bullnose 430 may be coupled to one or more of the slats during operation.

FIG. 3 and the other Figures included herein may be discussed with reference to particular positioning, configuration, or movement of a given slat. For example, FIG. 3 depicts left slat 410 in an extended position and coupled to bullnose 430, and right slat 420 in a retracted position uncoupled to bullnose 430. However, it should be understood that left slat 410 and right slat 420 are analogous mirror-imaged structures, and the mechanisms and processes corresponding to the operation of one slat apply similarly to the operation of the other slat. For example, FIG. 5A shows right slat 420 in an extended position and left slat 410 in a retracted position, while FIG. 5B shows left slat 410 in an extended position and right slat 420 in a retracted position.

For illustrative purposes, slat system 400 is shown positioned along a lower portion of LE element 340. In some examples, a slat system may extend along the entire height of LE element 340. In some examples, LE element 340 may include an additional symmetrical action slat system positioned along the upper portion above slat system 400. For example, the symmetry action slat system 400 may proliferate over the whole LE span, or it may comprise a plurality of structurally independent segments located span-wise. In current figures only one segment is shown at the root portion of the LE element 340.

With reference to FIGS. 4A and 4B, shown are top-down cross-sectional views of vertical tail structures with symmetry action slats, in accordance with one or more examples. FIGS. 4A and 4B illustrate top plan views of cross sections of vertical tail structures taken in accordance with directional arrows 450 in FIG. 2. For example, FIG. 4A may depict tail structure 300 with a single segment action slat and single hinge rudder.

Vertical tail structure 300 includes main element 310 comprising main element skin 312. Vertical tail structure further comprises LE element 340 with symmetry action slat system 400. As previously described, action slat system 400 comprises left slat 410 with left slat rails 412 and right slat 420 with right slat rails 422. Both slats 410 and 420 are in a retracted position and coupled to bullnose 430 via locking mechanisms 414 and 424, respectively. The vertical tail structure may be operating in a first mode when both slats are in the retracted position. Also shown are rollers 416 and 426 which guide slats 410 and 420, respectively, between the retracted and extended positions.

Vertical tail structure 300 comprises TE element 360 with a single hinge rudder which pivots about pivot axis 366. However, as previously described, symmetry action slat system 400 may be implemented with various configurations of vertical tail structures. Vertical tail structure 300-A shown in FIG. 4B comprises the same features of vertical tail structure 300 described above with a different TE element configuration. Vertical tail structure 300-A comprises TE element 360-A with a dual hinge rudder 365 including first rudder structure 365-A which may pivot about pivot axis 366-A and a second rudder structure 365-B which may pivot about pivot axis 366-B. In some examples, second rudder structure 365-B may be a servo-tab or anti-balance tab. For example, FIG. 4B may depict a cross section of tail structure 200-C in accordance with directional arrow 450.

In both structures 300 and 300-A, TE skin 362 of each TE element may extend from the main element. In some examples, TE skin 362 may be coupled to main element skin 312. In some examples, TE skin 362 may be a continuous extension of main element skin 312. As depicted, centerline 302 runs along the length of the vertical tail structures and intersects pivot axes of the rudders.

With reference to FIGS. 5A and 5B, shown are a top-down cross-sectional views of a vertical tail structure 300 with a slats in an extended position, in accordance with an illustrative example. The vertical tail structure may be operating in a second mode when one of the slats has been moved to an extended position. FIG. 5A illustrates right slat 420 in an extended position and coupled to bull nose 430 via locking mechanism 424, and with locking mechanism 414 disengaged. In some examples, a rudder may be operated in conjunction with an extended slat to adjust the camber of the vertical tail structure. As shown, rudder 364 has been pivoted about axis 366 toward the left of the vertical tail structure. FIG. 5B illustrates left slat in an extended position and coupled to bull nose 430 via locking mechanism 414, and with locking mechanism 424 disengaged. As shown, rudder 364 has been pivoted about axis 366 toward the right of the vertical tail structure.

In various examples, bullnose 430 includes a rounded front surface which defines the leading edge of the airfoil of the vertical tail structure. Bullnose 430 may be configured to be reversibly coupled to each slat. In some examples, the bullnose remains coupled to the extended slat and uncouples from the retracted slat during operation. Bullnose 430 may include front surface 530 and two rear surfaces 532-A and 532B which are configured to interface with front surfaces of the slats. Left rear surface 532-A is configured to interface with front surface 510 of left slat 410, and right rear surface 532-B is configured to interface with front surface 520 of right slat 420. The locking mechanism and interface between the bullnose and the slats will be further described below.

By configuring bullnose 430 as a common bullnose structure, an extended slat will include an airfoil with a rounded leading edge (front of bullnose 430) and a trailing edge (rear edge of slat 410 or 420). This provides an improved aerodynamic configuration as for the extended slat, in addition to a more aerodynamically desirable gap between the extended slat and the leading edge element with the retracted slat to allow for suction airflow. The shared bullnose 430 also provides improved kinematic features by allowing each slat to extend along a curved path corresponding to the respective slat rail without being hindered by any structure remaining on the other retracted slat. However, it should be recognized that in some examples, the bullnose structure may be a divided structure with each portion remaining with a respective slat.

Actuator Mechanisms

Figure 6A:
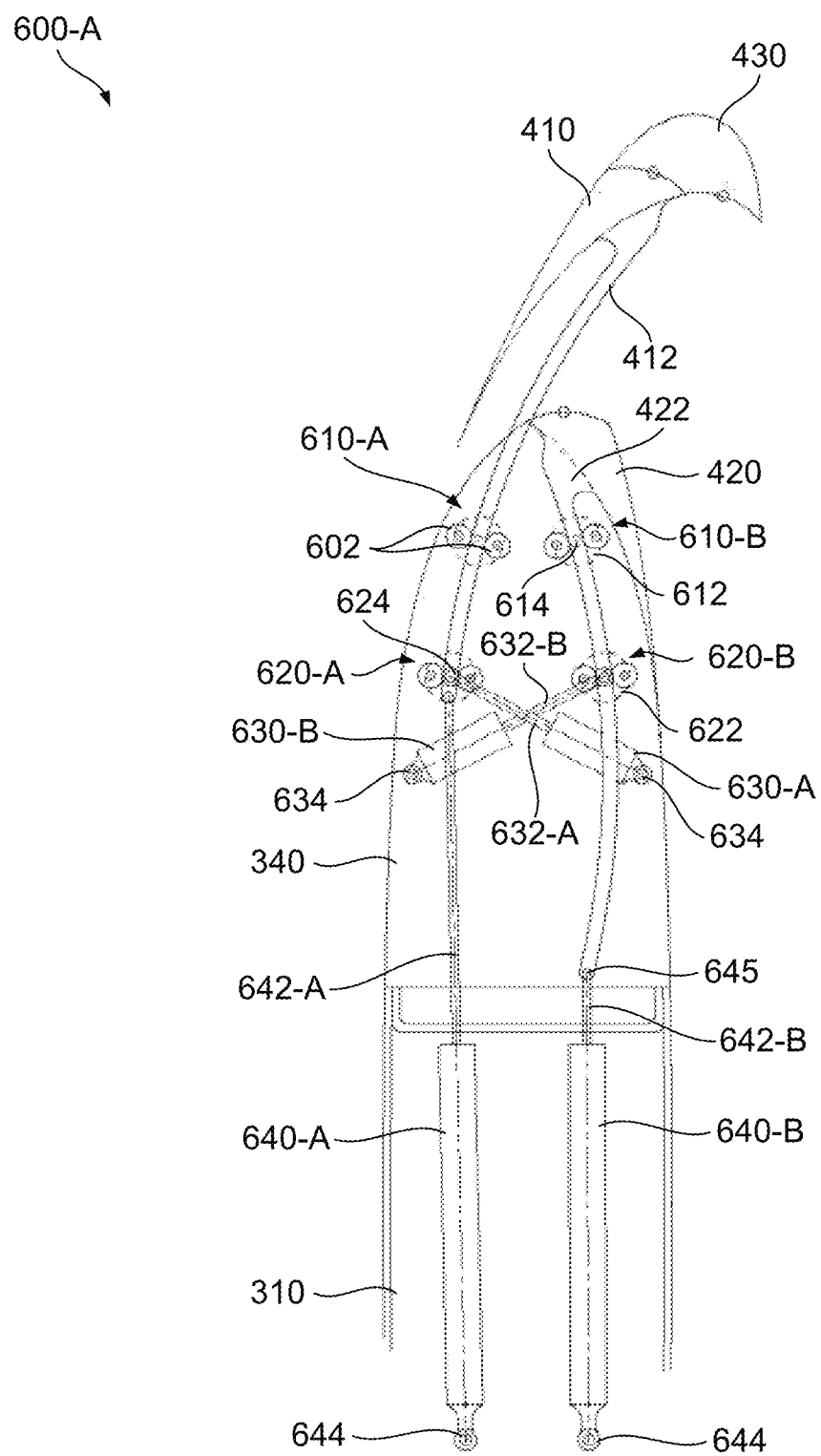
FIGS. 6A, 6B, and 6C illustrate internal actuator mechanisms of a vertical tail structure with symmetry action slats, in accordance with one or more examples.
Figures 6B, 6C:
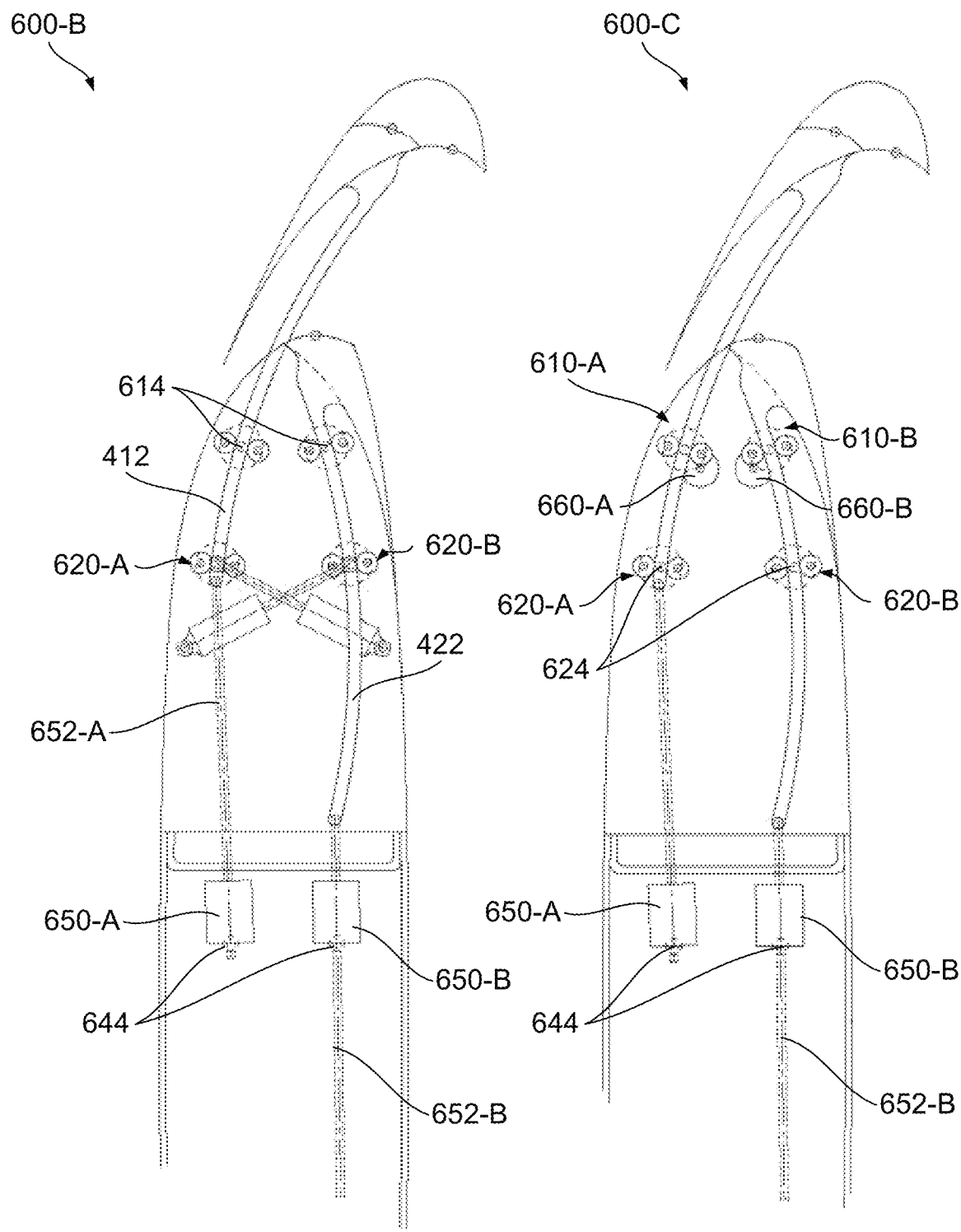

The symmetry action slat system may incorporate various mechanisms for extending and adjusting the position of the slats from the retracted position to various extended positions. FIGS. 6A, 6B, and 6C illustrate internal actuator mechanisms of a vertical tail structure with symmetry action slats, in accordance with one or more examples. FIG. 6A shows actuator system 600-A which may be implemented within symmetry action slat system 400. In various examples, actuator system 600-A comprises left longitudinal actuator 640-A and right longitudinal actuator 640-B located within main element 310. Left actuator shaft 642-A of longitudinal actuator 640-A may be coupled to left slat rail 412. Right actuator shaft 642-B of longitudinal actuator 640-B may be coupled to right slat rail 422. In some examples, actuators 640-A and 640-B may pivot about respective pivot axes 644. In some examples, the actuator shafts may also be coupled to the respective slat rails at hinged connection points 645 to allow for desired geometric tolerance during operation. However in some examples, connection point 645 may be an unmovable connection.

In various examples, the longitudinal actuators move the respective slat structures between retracted and extended positions. Such longitudinal actuators may be any type of appropriate actuator, such as pneumatic actuators, hydraulic actuators, or electric actuators. As shown left longitudinal actuator 640-A has moved left slat 410 to an extended position by pushing left slat rail 412 forward through rollers on platforms.

Each rail structure may travel upon sets of pivotable platforms through rollers 602. As illustrated left slat rail 412 travels upon left forward platform 610-A and left rear platform 620-A, and right slat rail 422 travels upon right forward platform 610-B and right rear platform 620-B. Each of the platforms may comprise a pivotable platform base. For example, forward platforms 610-A and 610-B may comprise forward platform bases 612, and rear platforms 620-A and 620-B may comprise rear platform bases 622. Although the platform bases 612 and 622 are depicted with a circular configuration, the platform bases may include various other geometric profiles in certain examples. Each platform may comprise a set of rollers 602 which guide the position of the respective rail structures to stay upon the platforms.

According to various examples, forward platforms 610-A and 610-B each comprise forward platform base 612 that rotates about a forward platform pivot 614 through the center of the respective forward platform base 612. According to various examples, rear platforms 620-A and 620-B each comprise rear platform base 622 that rotates about a rear platform pivot 624 through the center of the respective rear platform base 622. In various examples, pivots 614 and 624 may comprise various suitable mechanical structures, such as bearings. Such bearings may include, but are not limited to, plain bearings, rolling-element bearings including ball bearings or roller bearings, pivot bearings, rotary bearings, jewel bearings, fluid bearings, magnetic bearings, and flexure bearings.

In some examples, forward platform pivots 614 may be fixed such that forward platform bases 612 are restricted to only rotational movement about pivots 614. However, in some examples, the position of rear platforms 620-A and 620-B may be adjusted by lateral actuators. In some examples, rear platform pivots may be further coupled to lateral actuators. As shown, left lateral actuator 630-A is positioned to the right side within LE element 340, and may comprise left lateral actuator shaft 632-A that is coupled to rear platform pivot 624 of the left rear platform 620-A. As shown, right lateral actuator 630-B is positioned to the left side within LE element 340, and may comprise right lateral actuator shaft 632-B that is coupled to rear platform pivot 624 of the right rear platform 620-B.

In various examples, lateral actuators may control the lateral and/or forward position of the rear platforms to affect the angular position of an extended slat. For example, left lateral actuator shaft 632-A may be extended to push left rear platform 620-A toward the left. This lateral movement may cause left slat rail 412 to pivot about the fixed forward platform pivot 614 of the left forward platform 610-A and extend farther to the right of the vertical tail structure and increasing the STy distance.

Each lateral actuator may be rotatably coupled to a lateral actuator pivot 634 within LE element 340. Lateral actuator pivots 634 allow the lateral actuators to move to required positioned necessitated by the movement of the various components during operations. In some examples, lateral actuator pivots 634 may be fixed within LE element 340. Similarly, each longitudinal actuator pivot 644 may allow rotational movement of the respective longitudinal actuators necessitated by the movement of the various components during operation. In some examples, longitudinal actuator pivots 644 may be fixed within main element 310.

The slats and slat rails may travel through guidance structures other than rollers on one or more of the platforms. For example, the slat rails may slide through pivotable guide rails configured upon the forward and/or rear platforms. As another example, the slat rails may be coupled to a platform via a rail or track system which maintains the slat rail upon the platforms during operation.

FIGS. 6B and 6C illustrate actuator systems that implement jack screw actuators. As shown, actuator systems 600-B and 600-C comprise left jack screw actuator 650-A and right jack screw actuator 650-B within the main element with respective screw shafts 652-A and 652-B. Left screw shaft 652-A may be coupled to left slat rail 412, and right screw shaft 652-B may be coupled to right slat rail 422. In some examples, the actuator shafts may also be coupled to the respective slat rails at hinged connection points 645 to allow for desired geometric tolerance during operation. Each jack screw actuator may also be rotatably coupled to main element 340 at pivots 644.

Other types of actuators may be responsible for adjusting the lateral STy positioning of the slats. As shown, actuator system 600-B also implements a similar lateral actuator system as actuator system 600-A to control lateral movement of the rear platforms and the slats. However, actuator system 600-C may include geared motor actuators 660-A and 660-B that move forward platforms 610-A and 610-B, respectively, to adjust the lateral position of the slats. In actuator system 600-C, the rear platforms 620-A and 620-B may be configured with fixed rear platform pivots 624. In some examples, geared motor actuators may engage the respective forward platform via a geared interface, such as the teeth of a cogwheel, to transmit torque forces to adjust the lateral positioning of the forward platform (i.e., toward or away from the centerline). The lateral movement causes the slat to pivot about the respective fixed rear platform pivot 624.

The symmetry action slat systems described herein may utilize any combination of the actuator systems described, for example longitudinal actuators 640-A and 640-B may also be implemented with the geared electric motor actuators 660-A and 660-B. In various examples, other suitable linear actuators may be used to adjust positioning of the slats. As previously explained, left slat 410 and right slat 420 are analogous mirror-image structures and the same processes and mechanisms may be applied to right slat 420 to move the right slat between retracted and extended positions. For example, right longitudinal actuator 640-B may move right slat 420 to an extended position, and right lateral actuator 630-B may move right rear platform 620-B toward or away from the centerline.

In some examples, each slat may be configured with multiple slat rails. For example, the perspective view of vertical tail structure 300 in FIGS. 3A and 3B show each slat with a set of two slat rails. In some examples, the slats may include additional slat rails. In such examples each slat rail may travel along a respective forward and rear platform. In some examples, a longitudinal actuator system and a lateral actuator system may be implemented for each slat rail. However, in other examples, not every slat rail may be associated with actuator systems.

Locking Mechanisms

In various examples, each slat in the symmetry action slat system is coupled to a common bullnose structure in the retracted position. However, when a particular slat is extended, the slat that remains retracted may uncouple with the bullnose so that the bullnose may travel along with the extended slat. Various locking mechanisms may be implemented to secure the bullnose onto the desired slats. With reference to FIGS. 7A, 7B, 7C, and 7D, shown is a locking mechanism of a symmetry action slat system, in accordance with one or more examples.

Figure 7A:
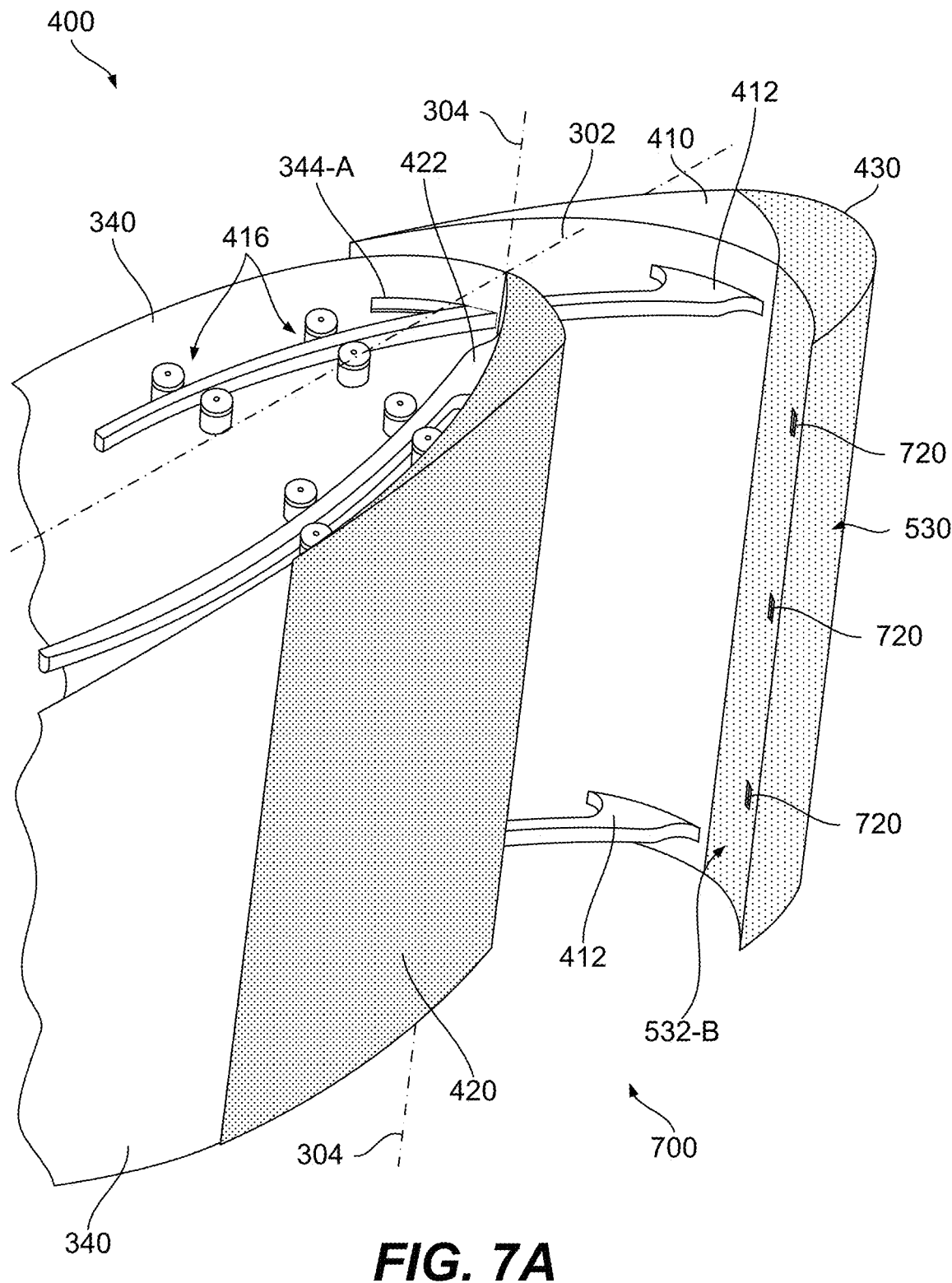
FIGS. 7A, 7B, 7C, 7D, and 7E illustrate a locking mechanism of a symmetry action slat system, in accordance with one or more examples.
Figure 7B:
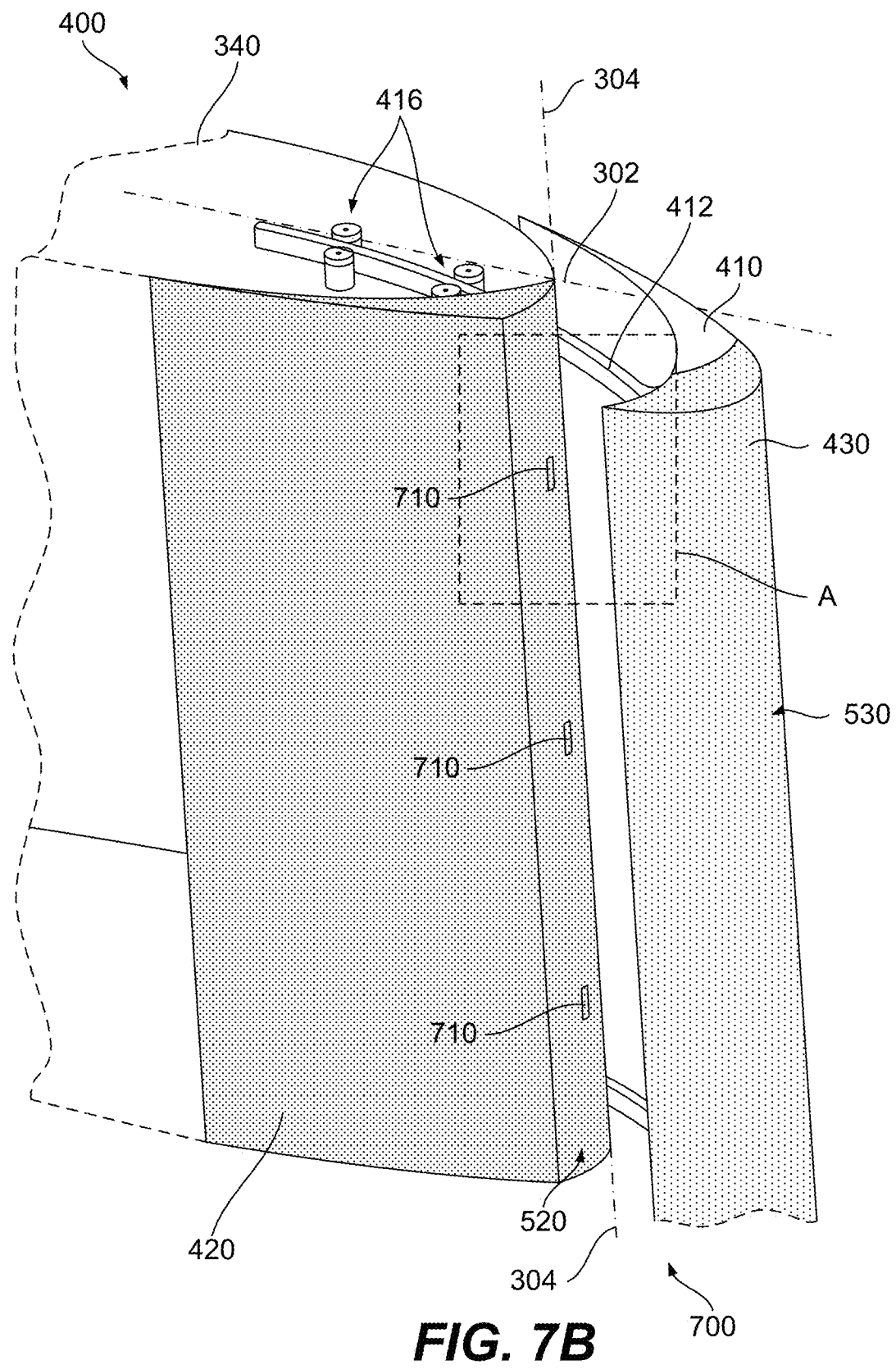

FIGS. 7A and 7B illustrate perspective views of a locking mechanism 700 in symmetry action slat system 400. As depicted, left slat 410 is in an extended position. Left slat rail 412 is shown to extend through left slat opening 344-A. In some examples, each rail is configured to extend through a corresponding slat opening. In some examples, corresponding left and right slat rails may share a single slat opening through the LE element. For example, a left slat rail 412 and right slat rail 422 may extend through a single slat opening in LE element 340. Extended left slat 410 is coupled to bullnose 430, while right slat 420 remains in a retracted position and is uncoupled to bullnose 430.

Various locking mechanisms may be implemented to secure the desired slat or slats to the bullnose. In some examples, symmetry action slat system 400 comprises one or more rotating bolts 710. Locking mechanism 700 is described with reference to locking bolts and bolt receivers located between right slat 420 and a right rear surface of the bullnose. However, similar concepts and components may be implemented on left slat 410 and the left rear surface of the bullnose.

In some examples, a series of locking bolts are positioned along the front surfaces (510 and 520) of the slats. As shown in FIG. 7B, a series of locking bolts 710 are positioned along the front surface 520 of right slat 420. In some examples, a series of corresponding bolt receivers are positioned along the rear surfaces (532-A and 532-B) of the bullnose. As shown in FIG. 7A, a series of bolt receivers 720 are positioned along right rear surface 532-B of bullnose 430. Each bolt receiver 720 may be aligned with locking bolts 710 when the slats are in the retracted position and front surfaces of the slats interface with respective rear surfaces 532-A and 532-B.

Figure 7C:
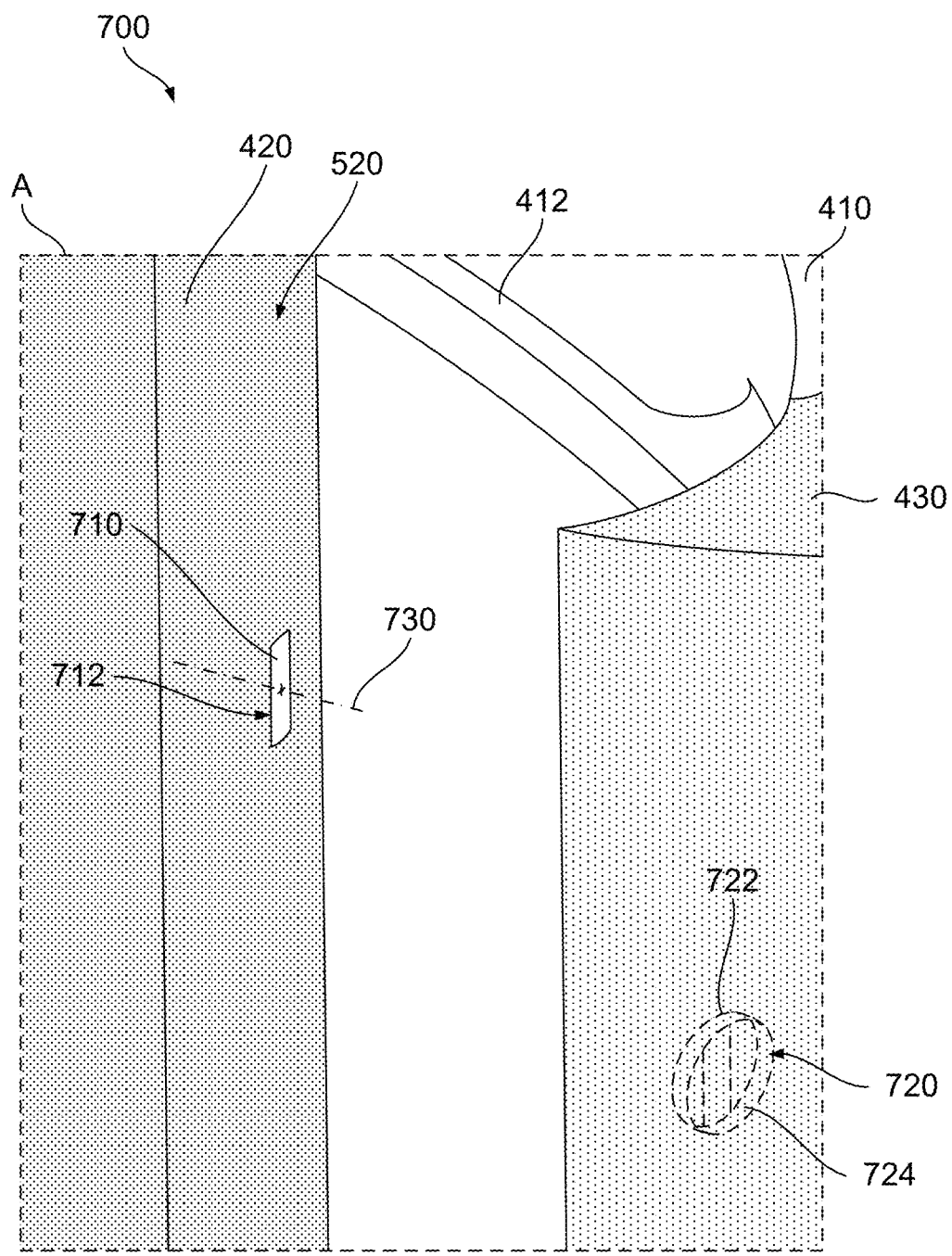
Figure 7D:
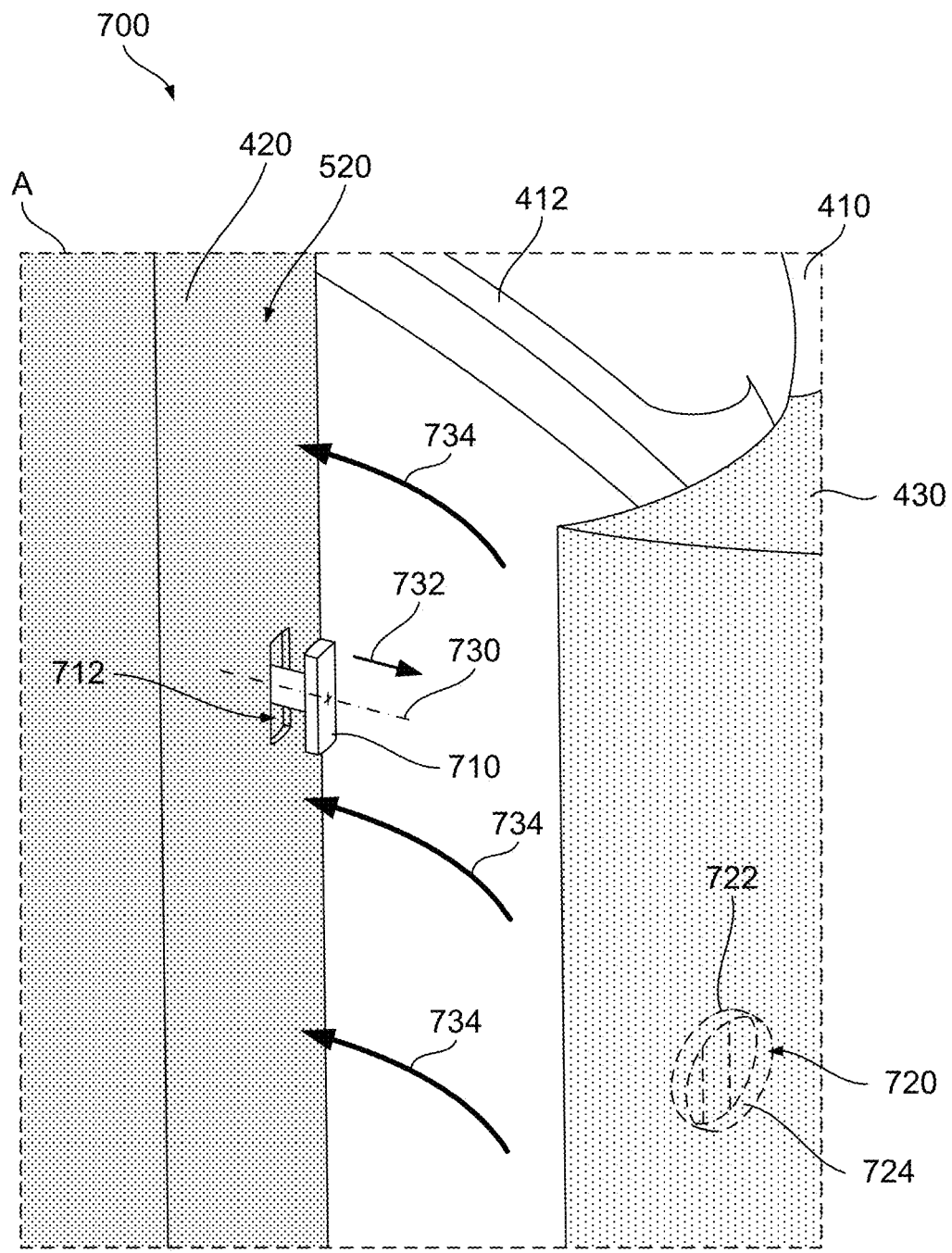

FIGS. 7C and 7D illustrate an enlarged view of a locking bolt of locking mechanism 700 in accordance with window A shown in FIG. 7B., locking bolt 710 is in a retracted position within bolt next 712. In the retracted position, the surface of locking bolt 710 may lay flush with front surface 520 of right slat 420. As depicted in FIG. 7D, locking bolt 710 has moved along bolt axis 730 in the direction of arrow 732 to an extended position. In this extended position, locking bolt 710 protrudes forward from front surface 520 of right slat 420.

As depicted, bolt receiver 720 comprises receiver opening 722 which opens into receiver cavity 724. Receiver opening 722 may include a geometry that is complementary to bolt 710 and allows bolt 710 to pass through receiver opening 722 into receiver cavity 724 when aligned. As shown, bolt 710 is in a first rotational position. As illustrated, bolt 710 may be aligned vertically the first rotational position. Receiver cavity 724 may include a circular geometry to allow bolt 710 to rotate once inside the cavity.

In some examples, locking bolt 710 moves to the extended position as the bullnose and left slat are moving to the retracted position (in the direction of arrows 734). However, in some examples, locking bolt 710 may remain in the retracted position until the left slat has full returned to the retracted position and rear surface 532-A has contacted the front surface 520 of right slat 420.

Figure 7E:
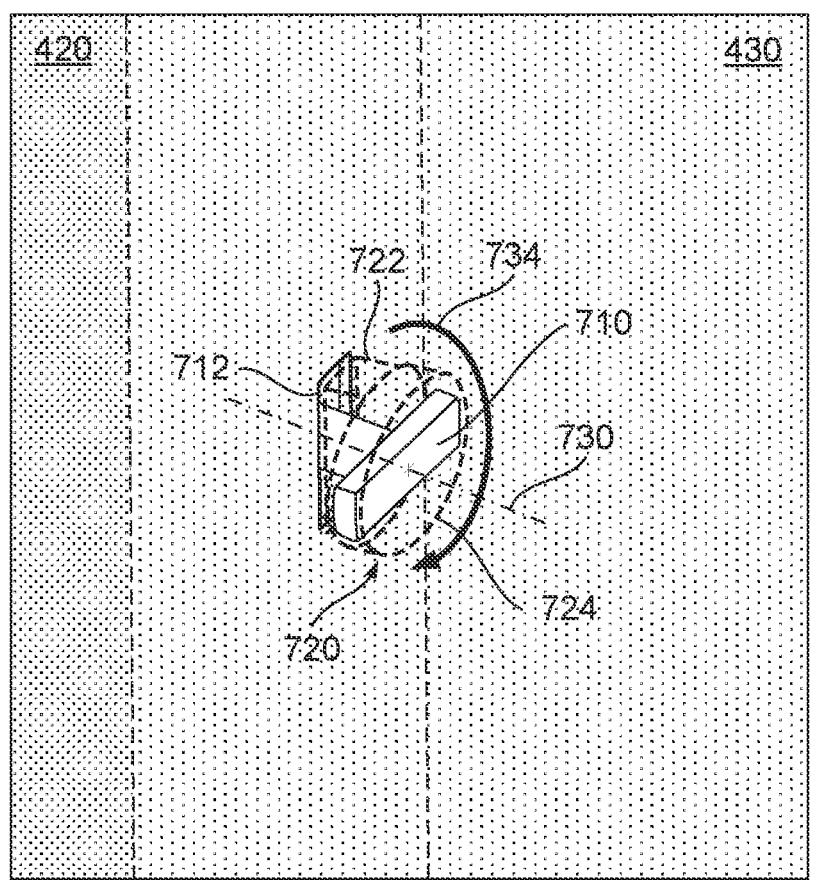

FIG. 7E illustrates another view of a locking bolt within a corresponding bolt receiver. As depicted in FIG. 7E, the slats and bullnose are completely in the retracted position, and bolt 710 is in an extended position and has passed through receiver opening 722. Furthermore, bolt 710 has rotated clockwise about bolt axis 730 in accordance with directional arrow 734 into a second rotational position within receiver cavity 724. In some examples, bolt 710 may rotate in an opposite counterclockwise direction. In some examples, the second vertical position may be about 90 degrees from the first rotational position. As illustrated, the bolt 710 may be aligned horizontally in the second rotational position. Once in the second rotational position, bolt 710 is secured within receiver cavity 724.

FIGS. 8A and 8B illustrate another locking mechanism 800 between the slats and a bullnose of a symmetry action slat system, in accordance with one or more examples. The top-down plan view shown in FIG. 8A, show left slat 410 in a semi-extended position and coupled to bullnose 430 via a row of lock springs 810. In some examples, the lock springs 810 are shape-memory alloys (SMA). The lock springs 810 in left slat are in a non-actuated mode and interlocked within left slots 820-A in the bullnose.

In the non-actuated mode, the ends of the lock spring may be urged against the sides of the corresponding slot 820-A. The lock springs 810 of right slat 420 also in an non-actuated mode. However, the lock springs 810 of right slat 420 are not engaged within the right slots 820-B in the bullnose, allowing bullnose to decouple from right slat 420 when left slat 410 is in the extended position.

FIG. 8B depicts a lock spring 810 in an actuated mode in which the ends of the lock spring are urged toward each other and away from the sides of the corresponding slot 820-A. This allows the bullnose to be pulled away from the slat without the ends of the lock spring engaging or catching any side of the slot.

In some examples, the shape-memory alloy is an alloy that can be deformed when cold but returns to its pre-deformed shape when heated. Thus, the lock springs may be pre-deformed in the non-actuated mode with the ends positioned away from each other. When separation between the slat and the bullnose is desired, the ends of the lock spring may be mechanically urged together into the actuated mode. Once the bullnose has been separated from the respective slat, heat may be added to the lock springs to return them back into the non-actuated mode. In some examples, the lock springs may remain in the actuated mode until the bullnose returned to the retracted position and is interfaced with the slat.

In various examples, safeguard measures may be implemented to ensure that at least one slat is coupled and locked to the bullnose at all times. Other mechanical locking mechanisms may be implemented in various examples. For example, an eyelet and pin couple may be implemented in the symmetry action slat system. As another example, a grooved shaft may be locked by a slotted movable plank with slots that may change from wide (at shaft diameter) to narrow (at a groove diameter).

Airfoil Geometry

Figure 9:
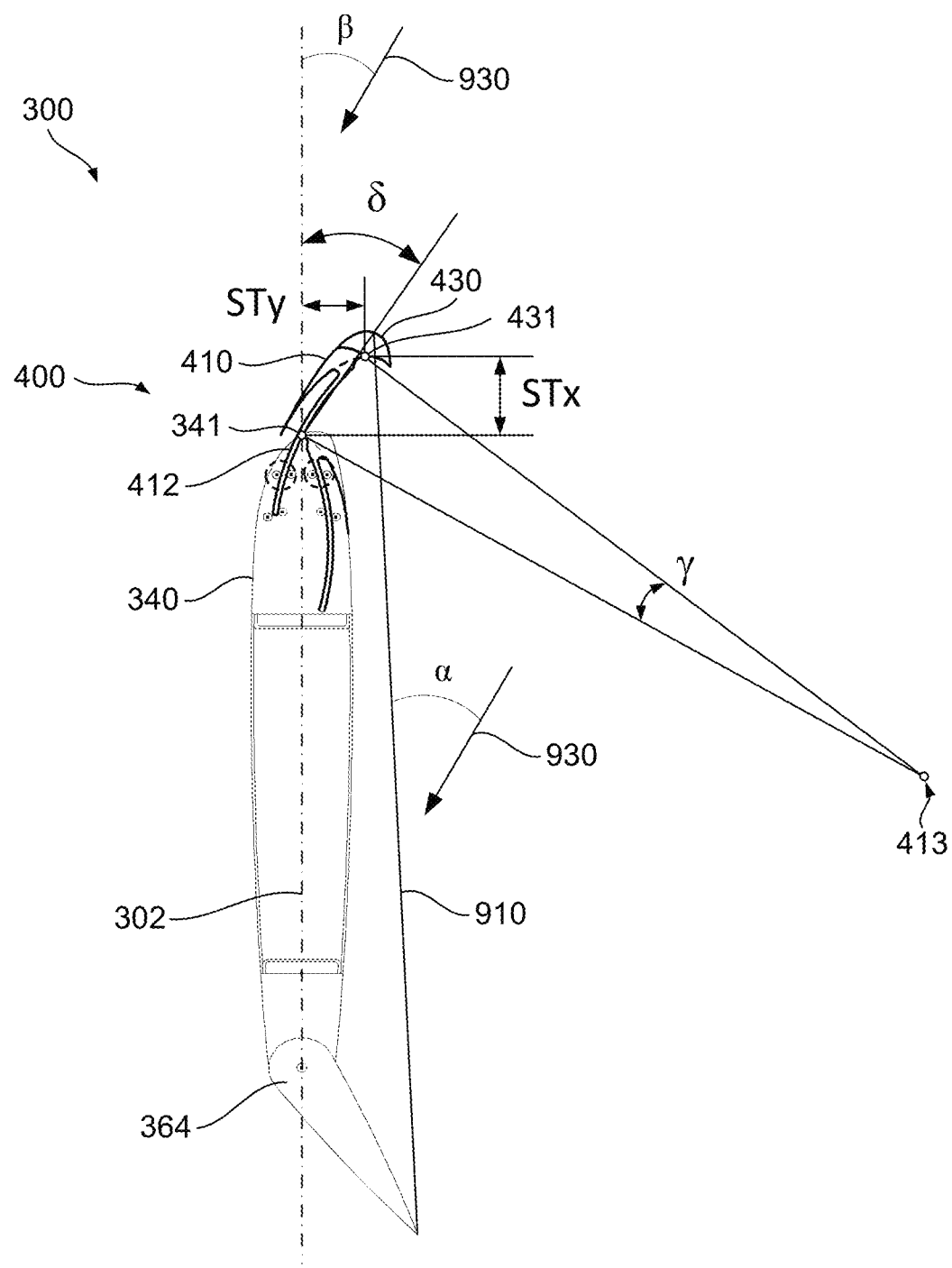
FIG. 9 illustrates various geometries of a vertical tail structure during operation, in accordance with one or more examples.

FIG. 9 illustrates various geometries of a vertical tail structure 300 during operation, in accordance with one or more examples. As shown, vertical tail structure 300 includes symmetry action slat system 400 with left slat 410 in an extended position. Chord line 910 is a straight line from the leading edge (i.e., tip of bullnose 430) to the trailing edge (i.e., tip of rudder 364).

The distance of travel of slat 410 (slat translation) can be broken down in an airplane axis system into the vector sum of a component of forward travel STx and a component of sideward travel STy. In some examples, STx and STy may be measured with respect to the relative distance between point 431 located at the center of the rear of bullnose 430 (i.e., a point where rear surfaces 432-A and 432-B meet) and point 341 located at the center of the front of LE element 340 (i.e., the original location of point 431 when the slats are in the retracted position).

The operational geometry of the vertical tail structure may also be defined by angles $\delta$ and $\gamma$. Angle $\gamma$ may indicate the amount of forward deployment of the slat rail, which is controlled by the longitudinal actuators. In some examples, the curved slat rails (412) may be are designed with a certain radius of curvature so as to optimize performance of the deployable symmetry action slats. Based on the geometry of curvature of the slat rail (412), an imaginary circle is formed with a center point 413. Then, the distance traveled forward by a slat (410) is equal to $\gamma$ (in radians).

The left slat shown in FIG. 9 may be in a maximum extended position with respect to angles $\delta$ and $\gamma$ (in radians). However, it should be understood that the slats are configured to be positioned by the actuators into multiple extended positions between a $\gamma$ of 0 and the maximum $\gamma$ value, as well as maximum and minimum $\delta$ values. By adjusting the slat translation, the system may be placed into a configuration to increase a maximum possible yawing moment compared to existing vertical tail structures.

Angle $\delta$ may indicate a pitch of the respective slat relative to the tail structure airfoil. In some examples, the pitch may be defined by angle $\phi$ as shown in FIGS. 10A, 10B, and 10C. In some examples, angle $\phi$ is defined by the angle between the centerline 302 and a line running from the leading edge to the centered point 341 on LE element 340. As shown, in some examples, the angle $\phi$ may be measured between centerline 302 and a chord line 1002 of the slat (i.e., a line from the leading edge at bullnose 430 to the trailing edge of slat 410). FIGS. 10A, 10B, and 10C illustrate changes in pitch $\phi$ of a left slat on a vertical tail structure 1000, in accordance with an illustrative example. Vertical tail structure 1000 may comprise an actuator system, such as actuator system 600-A, with left slat 410 in an extended position with varying values of $\phi$ at −30°, −20°, and −15°, respectively.

The angle $\phi$ of left slat 410 may be adjusted via left lateral actuator 630-A. Left actuator 630-A is shown to be pulling left rear platform 620-A toward centerline 302 to decrease angle $\phi$ from FIG. 10A to FIG. 10C, or move left rear platform 620-A away from centerline 302 from FIG. 10C to FIG. 10A, with platform 620-A being positioned furthest from the centerline in FIG. 10A and closest to the centerline in FIG. 10C. As left rear platform 620-A is moved toward or away from centerline 302, left slat rail 412 is pivoted about left forward platform 610-A, thereby changing the angle $\phi$. This movement can also be shown to cause left longitudinal actuator 640-A to pivot about the respective actuator pivot 644 toward or away from the centerline.

As previously explained, left slat 410 and right slat 420 are analogous mirror-image structures and the same processes and mechanisms may be applied to right slat 420 to move the right slat between retracted and extended positions. For example, right slat 420 may be extended and positioned at particular pitch angles $\phi$ toward the opposite side of centerline 302.

It should be understood that for different aircraft geometries, aerodynamic properties, and performance and stability and control attributes, different amounts of travel of the slats may be desired, and different angles ϕ and γ may be desired. Different combinations of angles ϕ and γ, or distances STx and STy, may be implemented to achieve a desired camber for the airfoil and adjust the lift coefficient (Cl) or yawing moment, as described with reference to FIGS. 11A, 11B, and 11C.

Figure 11A:
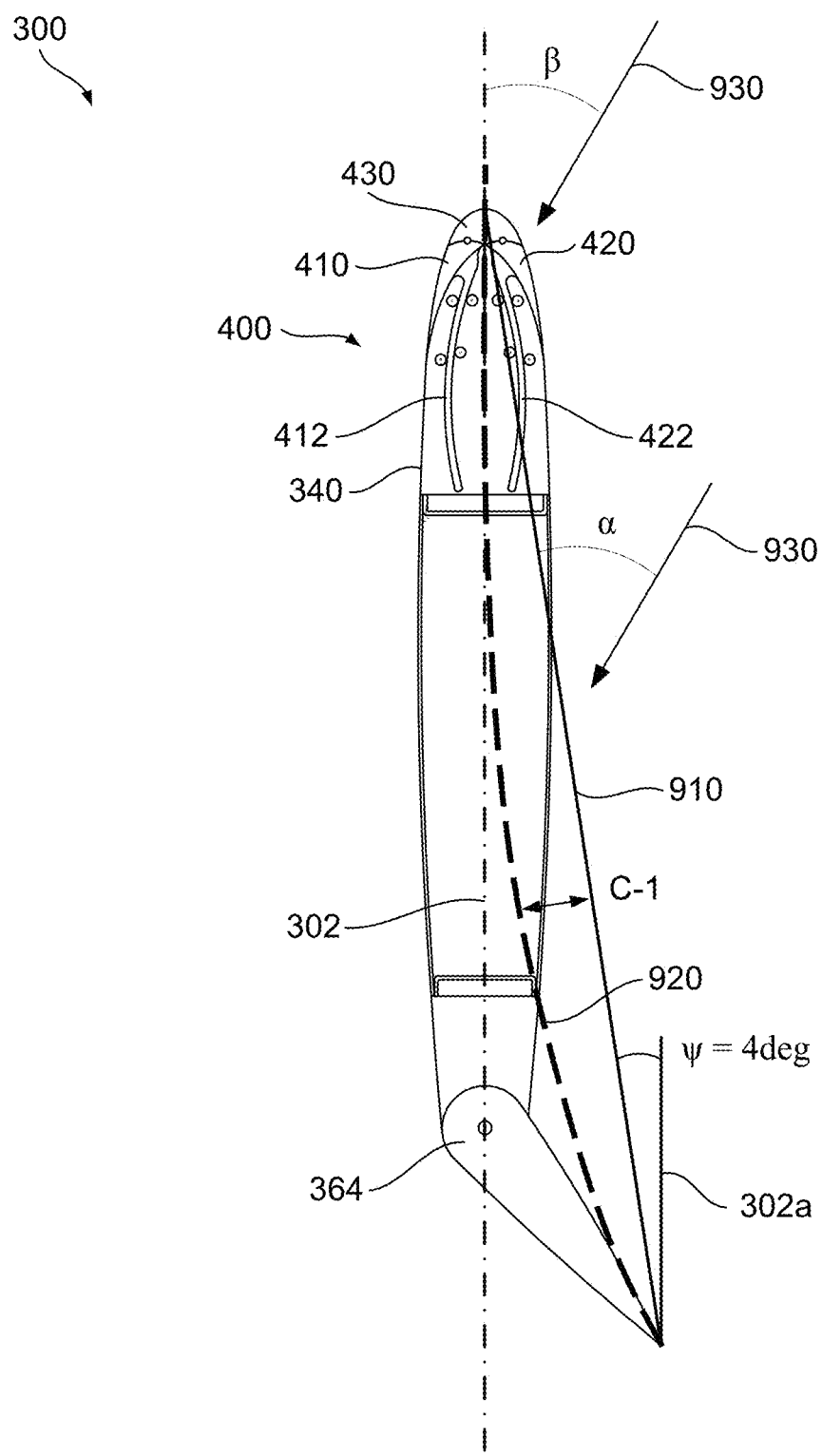
FIGS. 11A, 11B, and 11C illustrate changes in airfoil geometry during operation of vertical tail structures, in accordance with one or more examples.
Figure 11B:
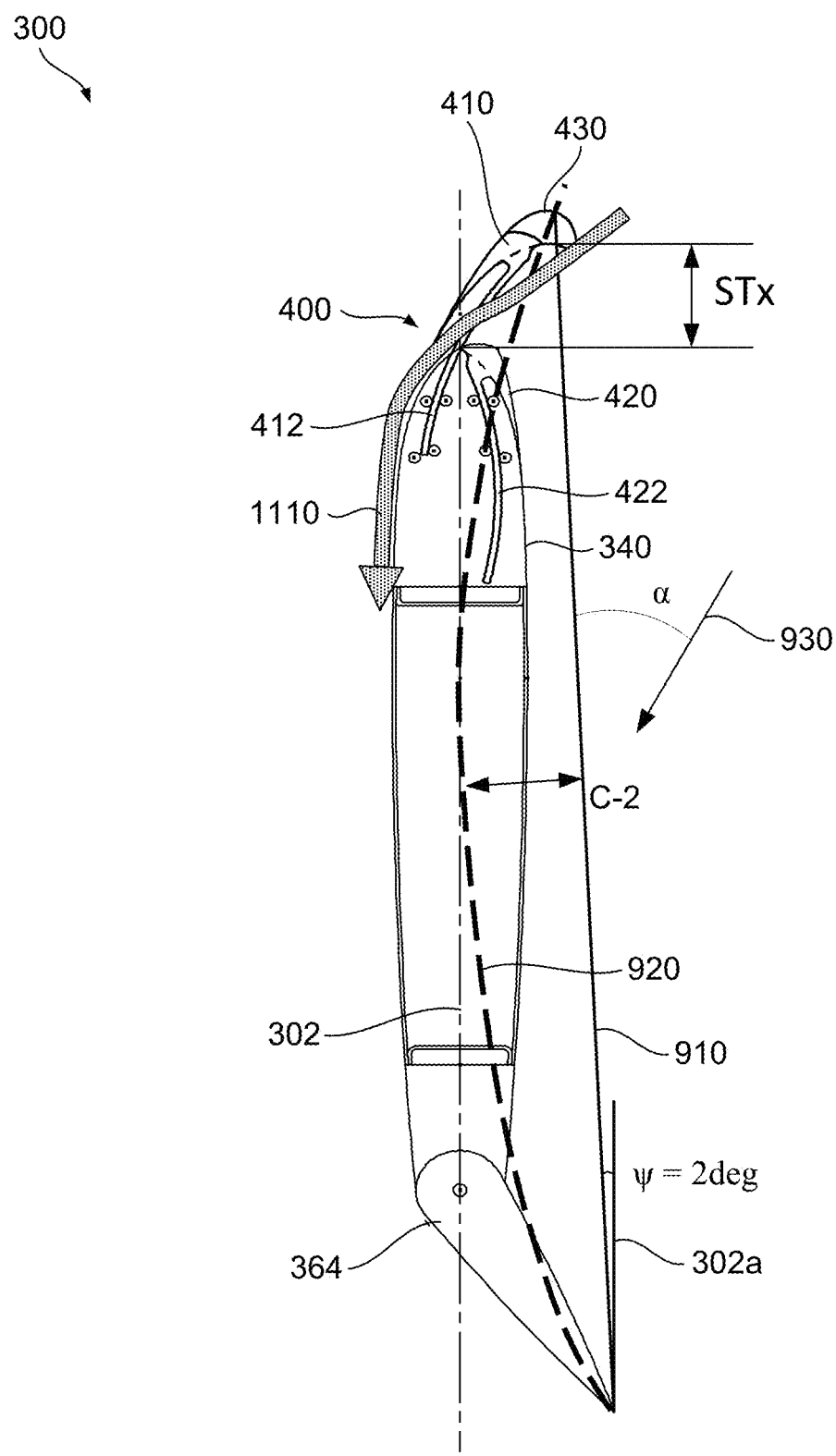
Figure 11C:
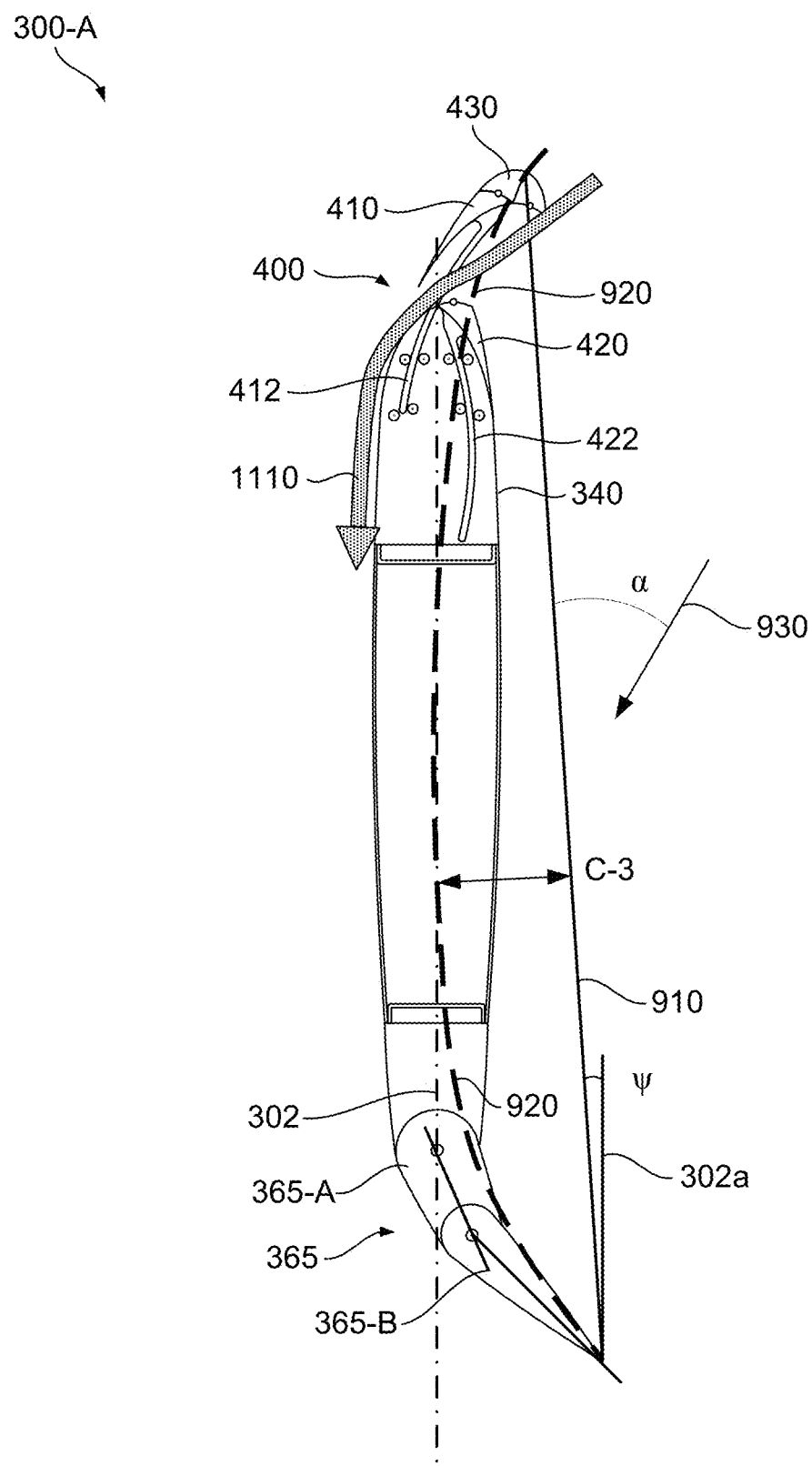

FIGS. 11A, 11B, and 11C illustrate changes in airfoil geometry during operation of vertical tail structures, in accordance with one or more examples. FIG. 11A depicts vertical tail structure 300 with symmetry action slat system 400 in a retracted position. As previously described, vertical tail structure 300 comprises a single hinge rudder 364. As depicted, rudder 364 is deflected toward the right of centerline 302, which shifts chord line 910 by angle ψ incident to the centerline. For purposes of illustration, line 302a is parallel to centerline 302 and shows the magnitude of incidence angle ψ of chord line 910 relative to centerline 302. As an example, the positioning of rudder 364 may shift chord line 910 by an angle ψ of four (4) degrees from the centerline. This configuration additional curves camber line 920 toward the right of the centerline to the trailing edge, resulting in camber C-1.

FIG. 11B depicts vertical tail structure 300 with left slat 410 moved to an extended position, and rudder 364 deflected at the same rightward position as FIG. 11A. With left slat 410 in an extended position, the leading edge at bullnose 430 is shifted forward and toward the right of centerline 302. This reduces the angle ψ incident to the centerline, which may be two (2) degrees in the example shown. The slat positioning further shifts camber line 920 and increases the camber value to C-2, resulting in a greater camber sag.

FIG. 11C depicts vertical tail structure 300-A with left slat 410 in the same extended position as shown in FIG. 11B. As previously described, vertical tail structure 300-A comprises a dual-hinge rudder 365 with first rudder structure 365-A and second rudder structure 365-B. With a dual-hinge rudder, vertical tail structure 300-A may be operable to reach further to the right of centerline 302 as compared to rudder 364 of tail structure 300. This may also result in a lower incident angle ψ of the chord line 910 relative to the centerline. For example, angle ψ may be between 2 and 4 degrees in the example shown in FIG. 11C. The geometry of the dual-hinge rudder may additionally adjust camber line 920 and increase the camber value to C-3 with a greater camber sag.

Typically, a side slip angle indicates the rotation of the aircraft centerline from the relative wind direction. As described herein, side slip angle β indicates the angle between centerline 302 (centerline of the aircraft) and the relative wind direction (arrow 930), as shown in FIGS. 9 and 11A. In other words, the sideslip angle is essentially the directional angle of attack of the airplane. Typically, the angle of attack specifies the angle between the chord line of the wing of an aircraft and the relative wind direction. Because extension of a slat shifts the chord line of the airfoil geometry (similar to that of an aircraft wing), an effective angle of attack α may be determined to indicate the angle between the particular chord line 910 of the vertical tail structure and the relative wind direction (arrow 930). The effective angle of attack α is illustrated in FIG. 9, and 11A-C.

In various examples, the increase in the camber sag may increase the lift coefficient (Cl) of the vertical tail structure. However, extending the slat to an extended position may appear to decrease the effective angle of attack α (and angle ψ), thereby decreasing the Cl of the vertical tail structure. To resolve this contradiction, the Cl may be calculated as a function of two parameters, such as angle ϕ or δ and angle γ. Cl may also be calculated as a function of angle ϕ or δ and the vector sum of STx and STy.

FIGS. 11B and 11C further illustrate suction airflow created when the slat is deployed. Suction airflow is depicted by arrow 1110 which travels between the extended slat and LE element 340. In the examples shown in FIGS. 11B and 11C, the suction airflow created by extended left slat 410 keeps the air attached to the left of the vertical tail structure, which further delays flow separation and the stall condition with the rudder fully deflected. Much like slats on the leading edges of wings of fixed-wing aircraft, the suction airflow created by extended slats may allow the vertical tail structure to operate at a higher angle of attack or side slip angle, and produce a higher lift coefficient Cl, as will be further explained below.

Airfoil Performance

Figure 12:
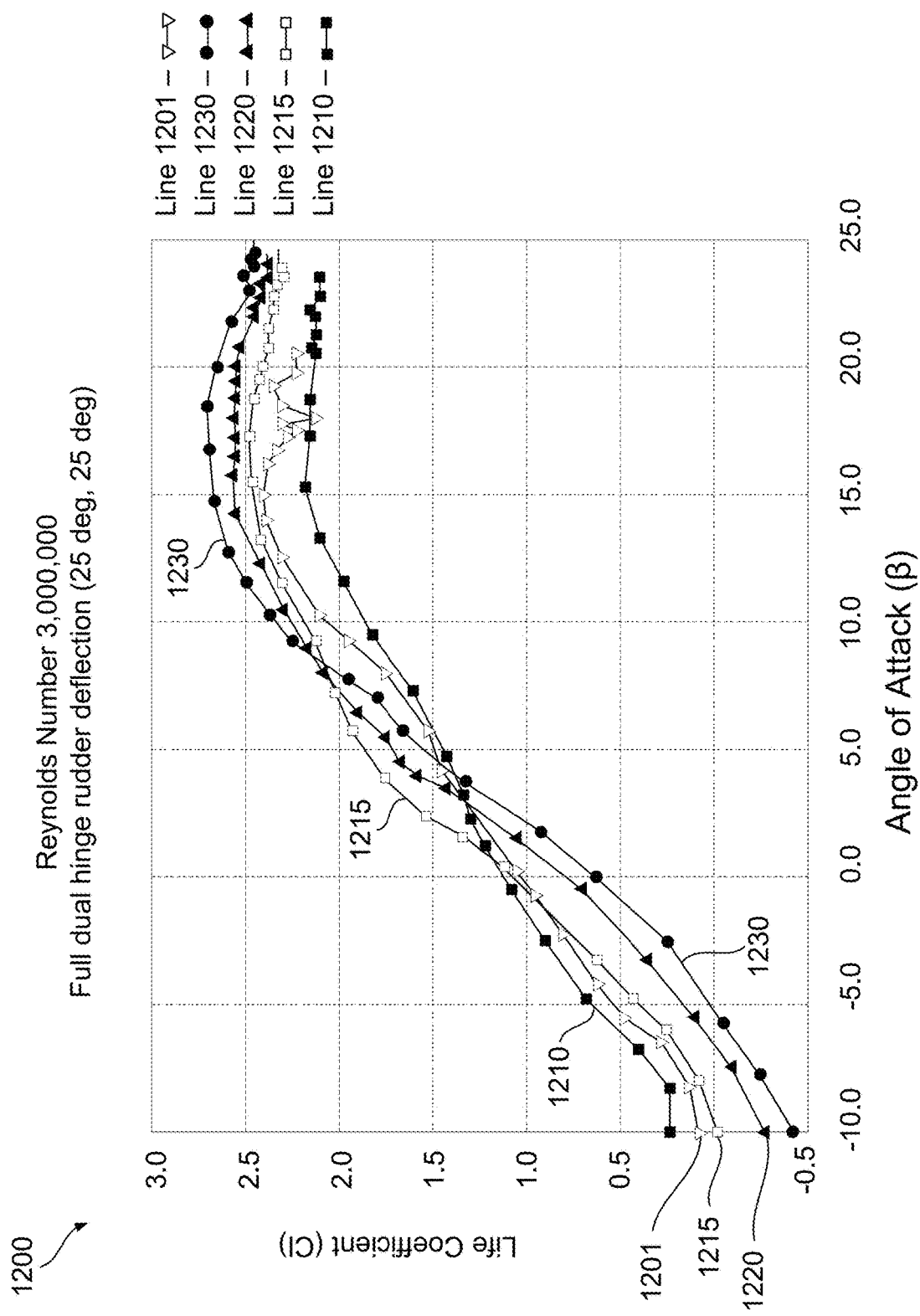
FIG. 12 illustrates computational fluid dynamic measurements for various vertical tail structures, in accordance with one or more examples.

FIG. 12 illustrates computational fluid dynamic (CFD) measurements for a vertical tail structure, in accordance with one or more examples. Graph 1200 in FIG. 12 shows results of CFD measurements for a vertical tail structure configured with a dual hinge rudder at a constant γ angle of 20.0° and different pitch angles ϕ versus various side slip angles β (between relative airflow direction and the centerline). The dual hinge rudder is at full deflection (25 deg, 25 deg); in other words, each segment of the dual hinge rudder is deflected at 25 degrees relative to the centerline of the prior segment.

Line 1201 plots the Cl versus β of the vertical tail structure with no extended slat. Line 1230 plots the Cl versus the β of the vertical tail structure with slat extended at γ=20.0° and ϕ=−30°. Line 1220 plots the Cl versus the β of the vertical tail structure with slat extended at γ=20.0° and ϕ=−20°. Line 1215 plots the Cl versus the β of the vertical tail structure with slat extended at γ=20.0° and ϕ=−15°. Line 1210 plots the Cl versus the β of the vertical tail structure with slat extended at γ=20.0° and ϕ=−10°.

Several conclusions may be gathered from graph 1200. First, the data indicates that extending the slat to any extended position may delay the stall angle of attack by roughly 7-8 degrees. For a negative slat pitch ϕ of −30° (line 1230), the maximum Cl increased from 2.35 to 2.71 relative to no extended slat (line 1201). However, for small angles of attack (such as between −0.5 to 4.1), the Cl for a negative slat pitch is lower as compared to a vertical tail structure without an extended slat ϕ of −30°.

Where angle ϕ is increased to −15° (line 1215), the Cl is greater for angles of attack β greater than or equal to approximately 0.0° as compared to the vertical tail structure without an extended slat (line 1201). Additionally, the maximum Cl of the example vertical tail structure with angle ϕ at −15° and γ at 20° (line 1215) is approximately the same as the vertical tail structure without an extended slat. Thus, graph 1200 indicates that a symmetry action slat system with variable ϕ and nominal γ may increase the Cl of a vertical tail structure across the spectrum of operational angles of attack and dramatically delays stall conditions.

Method of Operation

Figure 13:
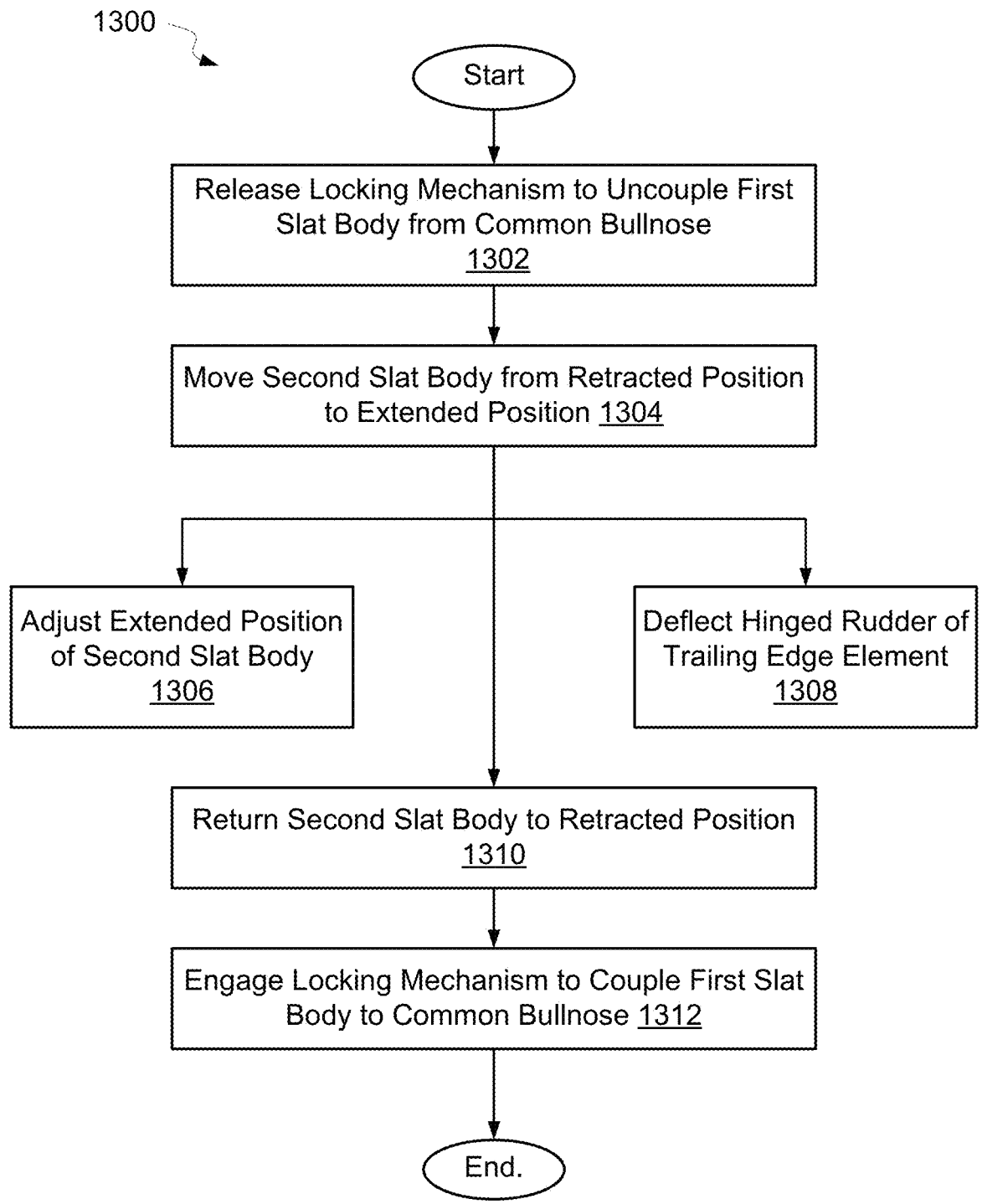
FIG. 13 illustrates an example process for operating a vertical tail structure with symmetry action slats, in accordance with one or more examples.

Also provided are methods of manufacturing a stringerless sandwich fuselage barrel. With reference to FIG. 13, shown is an example process 1300 for operating a vertical tail structure with symmetry action slats, in accordance with one or more examples. In various examples, the vertical tail structure may be any one of the vertical tail structures described herein, such as structures 300 or 300-A, with symmetry action slat systems, such as slat system 400.

At 1302, a locking mechanism is released to uncouple a first slat body from a common bullnose structure. In an illustrative example, the first slat body may be right slat 420. For example, the locking mechanism may be locking mechanism 700. As described, one or more bolts 710 may be in a locked position within receiver cavities 724 of respective bolt receiver 720. In some examples, a bolt 710 may be released by rotating the bolt to align with the respective receiver opening 722. In some examples, the bolt 710 may further be retracted into bolt nest 712 in the first slat body.

As another example, the locking mechanism may be locking mechanism 800. As described, one or more lock springs 810 may be in a non-actuated mode within corresponding slots, such as 820-A or 820-B, to securely couple each slat body to the bullnose. The desired lock springs 810 may be released by mechanically urging the ends of the lock springs together to a deformed shape such that the ends no longer engage with the edges of the respective slots.

At 1304, a second slat body is moved from a retracted position to an extended position. In the illustrative example, the second slat body may be left slat 410. Once the locking mechanism has released the bullnose from the right slat 420, the bullnose will be free to travel with left slat 410, to which it is still securely coupled. Left slat 410 may be moved from the retracted position to the extended position by an actuator, such as actuators 640-A or 650-A.

Once in the extended position, the second slat body may be moved to adjust the extended position at 1306. As previously explained, different amounts of travel of the slats may be desired. Thus, the extended position of the slat may be adjusted to vary the combinations of angles $\phi$ and $\gamma$, or distances STx and STy, to achieve the desired lift coefficient (Cl). In some examples, a hinged rudder, such as rudders 364 or 365, of a trailing edge element may be deflected at 1308 to further adjust the airfoil of the vertical tail structure.

A combination of adjustments to the extended position of the second slat body and deflection of the rudder via operations 1302 to 1308 may be implemented to achieve a desired amount of stabilization by the vertical tail surface to generate and control the yawing motion of the aircraft. Operations 1302 through 1308 above may be implemented to provide stability for an aircraft during flight and prevent unwanted side-to-side, or yawing, motion of the aircraft nose. In some examples, the rudder may be initially deflected to stabilize the aircraft. Slats may then be extended and positioned (operations 1302 to 1306) if additional corrective force is required.

Once the stabilization of the aircraft is no longer required, the second slat body may be returned to the retracted position at 1310. The left slat may be retracted by the actuator which pulls the slat back toward the LE element. Once the second slat body has returned to the retracted position, and rear surface 532-B interfaces with front surface 520, the locking mechanism is engaged to couple the first slat body to the common bullnose structure at 1312. In the example of locking mechanism 700, the locking bolts 710 of right slat 420 may be extended through receiver openings 722 of respective receivers 720, and rotated within the corresponding receiver cavity 724 to securely engage the locking mechanism. In the example of locking mechanism 800, the lock springs 810 may be heated to return the lock springs to their pre-deformed shape in the actuated mode to engage the respective slots.

When subsequent stabilization is required, process 1300 may be repeated to unlock, extend, and position the appropriate slat body. Although process 1300 has been described with respect to the right slat as the first slat body and the left slat as the second slat body, the first slat body may by the left slat and the second slat body may be the right slat depending on the desired direction of stabilization. For example, the left slat maybe uncoupled from the bullnose to allow right slat to be moved into the extended position during operation.

Aircraft Examples

Figure 14:
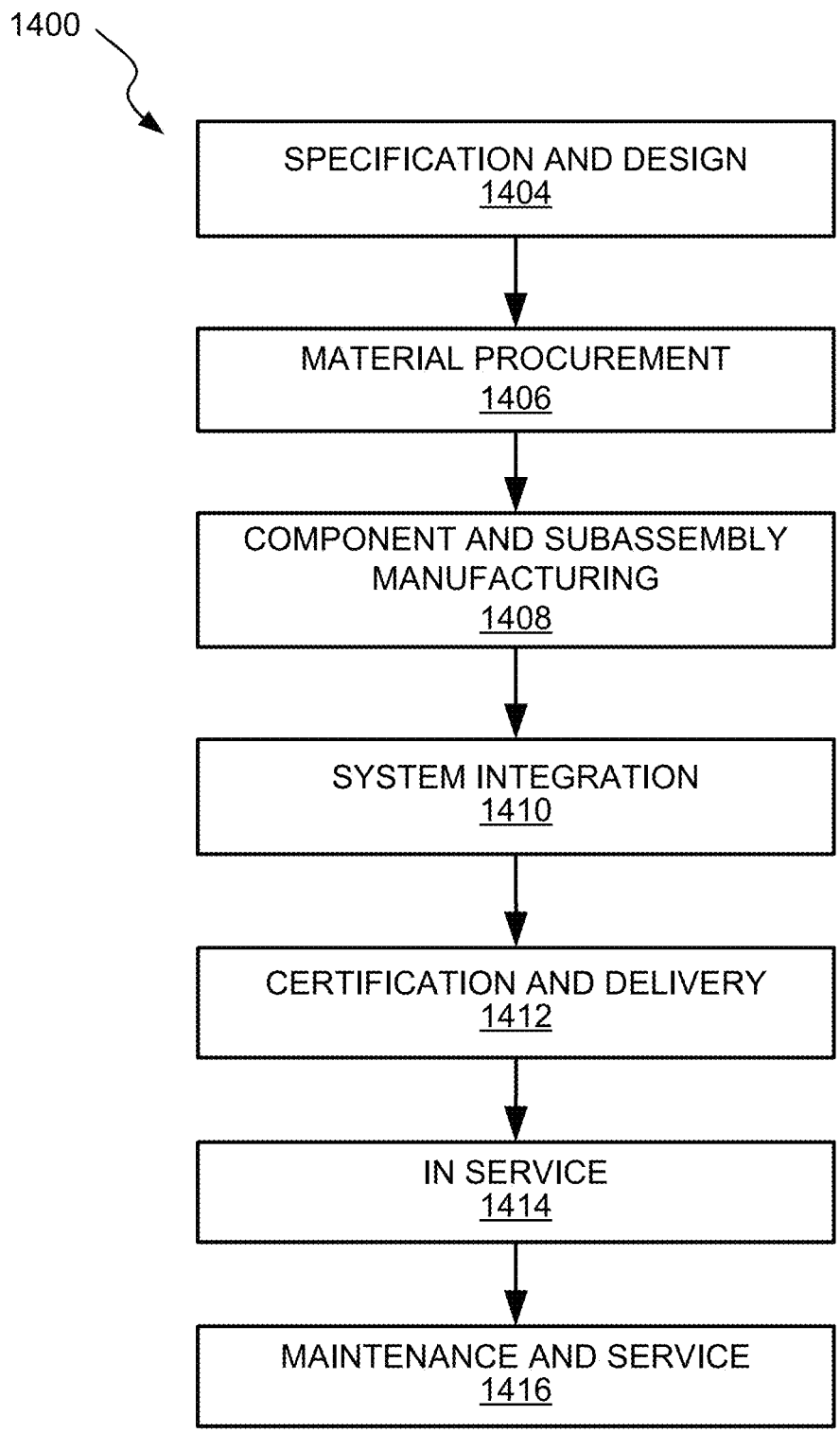
FIG. 14 is a block diagram of aircraft production and service methodology that may utilize methods and assemblies described herein.

Examples of the present disclosure may be described in the context of aircraft 100 as shown in FIG. 1 and aircraft manufacturing and service method 1400 as shown in FIG. 14. As previously described, FIG. 1 is a schematic illustration of an aircraft 100 which may comprise various vertical tail structures as described herein. Although an aerospace example is shown, the principles disclosed herein may be applied to other industries, such as the automotive industry. Accordingly, in addition to aircraft 100, the systems, apparatus, and methods disclosed herein may apply to other vehicles, e.g., land vehicles, marine vehicles, space vehicles, etc.

FIG. 14 is a block diagram of aircraft production and service methodology that may utilize methods and assemblies described herein. During pre-production, illustrative method 1400 may include specification and design (block 1404) of aircraft 100 and material procurement (block 1406). During production, component and subassembly manufacturing (block 1408) and inspection system integration (block 1410) of aircraft 100 may take place. Described apparatus, and corresponding methods of operation and manufacture, may be implemented in any of specification and design (block 1404) of aircraft 100, material procurement (block 1406), component and subassembly manufacturing (block 1408), and/or inspection system integration (block 1410) of aircraft 100.

Thereafter, aircraft 100 may go through certification and delivery (block 1412) to be placed in service (block 1414). While in service, aircraft 100 may be scheduled for routine maintenance and service (block 1416). Routine maintenance and service may include modification, reconfiguration, refurbishment, etc. of one or more inspection systems of aircraft 100. Described apparatus, and corresponding methods of operation and manufacture, may be implemented in any of certification and delivery (block 1412), service (block 1414), and/or routine maintenance and service (block 1416).

Each of the processes of illustrative method 1400 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

CONCLUSION

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure.

While the present disclosure has been particularly shown and described with reference to specific examples thereof, it will be understood by those skilled in the art that changes in the form and details of the disclosed examples may be made without departing from the spirit or scope of the present disclosure. The description of the different illustrative examples has been presented for purposes of illustration and description, and is not intended to be exhaustive or limited to the examples in the form disclosed. Many modifications and variations will be apparent to those of ordinary skill in the art. It is therefore intended that the present disclosure be interpreted to include all variations and equivalents that fall within the true spirit and scope of the present disclosure. Accordingly, the present examples are to be considered as illustrative and not restrictive.

Although many of the components and processes are described above in the singular for convenience, it will be appreciated by one of skill in the art that multiple components and repeated processes can also be used to practice the techniques of the present disclosure.

What is claimed is:

1. A vertical tail structure comprising:
a main element; and
a leading edge element comprising a first slat body and a second slat body,
wherein the slat bodies are symmetrically positioned on either side of a longitudinal centerline of the vertical tail structure;
wherein each slat body is configured to move between a retracted position and an extended position to increase a camber sag of an airfoil of the vertical tail structure and thereby increase a maximum aerodynamic yawing moment provided by the vertical tail structure.

2. The vertical tail structure of claim 1,
wherein the vertical tail structure is configured to operate in a first mode and a second mode;
wherein in the first mode, each of the slat bodies are in the respective retracted position; and
wherein in the second mode, either the first slat body or the second slat body is in the respective extended position.

3. The vertical tail structure of claim 2, wherein the extended position of each of the slat bodies includes a pitch angle ($\phi$) of the respective slat body and an extension distance ($\gamma$) of the slat body from the main element.

4. The vertical tail structure of claim 2,
wherein the leading edge element further comprises a bullnose that is reversibly coupled to each of the slat bodies when the vertical tail structure is in the first mode,
wherein the bullnose is decoupled from the second slat body when the first slat body is in the respective extended position in the second mode.

5. The vertical tail structure of claim 4, wherein the bullnose defines a leading edge of the vertical tail structure and is symmetrically positioned with respect to the longitudinal centerline of the vertical tail structure.

6. The vertical tail structure of claim 4, wherein in the first mode, the bullnose is reversibly coupled to each of the slat bodies via a locking mechanism.

7. The vertical tail structure of claim 2 further comprising a trailing edge element comprising a rudder.

8. The vertical tail structure of claim 2, further comprising:
a set of slat rails coupled to each slat body, wherein each slat rail is configured to travel between rollers on a rotating platform; and
an actuator for moving each slat body between the respective retracted position and respective extended position.

9. An aircraft comprising a vertical tail structure, wherein the vertical tail structure comprises:
a main element; and
a leading edge element comprising a first slat body and a second slat body, wherein the slat bodies are symmetrically positioned on either side of a longitudinal centerline of the vertical tail structure;
wherein each slat body is configured to move between a retracted position and an extended position to increase a camber sag of an airfoil of the vertical tail structure and thereby increase a maximum aerodynamic yawing moment provided by the vertical tail structure.

10. The aircraft of claim 9,
wherein the vertical tail structure is configured to operate in a first mode and a second mode;
wherein in the first mode, each of the slat bodies are in the respective retracted position; and
wherein in the second mode, either the first slat body or the second slat body is in the respective extended position.

11. The aircraft of claim 10, wherein the extended position of each of the slat bodies includes a pitch angle ($\phi$) of the respective slat body and an extension distance ($\gamma$) of the slat body from the main element.

12. The aircraft of claim 10,
wherein the leading edge element further comprises a bullnose that is reversibly coupled to each of the slat bodies when the vertical tail structure is in the first mode,
wherein the bullnose is decoupled from the second slat body when the first slat body is in the respective extended position in the second mode.

13. The aircraft of claim 12, wherein the bullnose defines a leading edge of the vertical tail structure and is symmetrically positioned with respect to the longitudinal centerline of the vertical tail structure.

14. The aircraft of claim 12, wherein in the first mode, the bullnose is reversibly coupled to each of the slat bodies via a locking mechanism.

15. The aircraft of claim 10 further comprising a trailing edge element comprising a rudder.

16. The aircraft of claim 10, further comprising:
a set of slat rails coupled to each slat body, wherein each slat rail is configured to travel between rollers on a rotating platform; and
an actuator for moving each slat body between the respective retracted position and respective extended position.

17. A method for increasing a maximum aerodynamic yawing moment provided by a vertical tail structure,
wherein the vertical tail structure comprises a main element, a leading edge element comprising a first slat body and a second slat body, wherein the slat bodies are symmetrically positioned on either side of a longitudinal centerline of the vertical tail structure;
wherein the method comprises:
moving the first slat body from a first retracted position to a first extended position to increase a camber sag of an airfoil of the vertical tail structure, wherein the second slat body remains in a second retracted position.

18. The method of claim 17, wherein the extended position includes a pitch angle ($\phi$) of the second slat body and an extension distance ($\gamma$) of the second slat body from the main element.

19. The method of claim 17,
wherein the vertical tail structure further comprises a bullnose reversibly coupled to each of the slat bodies; and wherein the method further comprises:
> releasing a locking mechanism to uncouple the second slat body from the bullnose prior to moving the first slat body from the first retracted position to the first extended position, wherein the bullnose remains coupled to the first slat body.

20. The method of claim 19, further comprising deflecting a rudder of a trailing edge element of the vertical tail structure to further increase the camber sag of the airfoil.

* * * * *